United States Patent [19]

Reeves et al.

[11] Patent Number: 5,234,740

[45] Date of Patent: Aug. 10, 1993

[54] SLIP CONTROL SHEETING AND ARTICLES COVERED WITH SAME

[75] Inventors: Mark E. Reeves, Maplewood; Margaret A. Hartfel, Minneapolis, both of Minn.; Forrest J. Rouser, San Rafael, Calif.; Kenneth L. Smith, White Bear Lake, Minn.

[73] Assignee: Minnesota Mining and Manufacturing Company, St. Paul, Minn.

[21] Appl. No.: 751,147

[22] Filed: Aug. 28, 1991

[51] Int. Cl.$^5$ .................. B32B 3/28; A63B 49/08; B25G 1/01; B62K 21/26

[52] U.S. Cl. .................. 428/167; 428/76; 428/172; 428/120; 428/141; 428/212; 428/245; 428/284; 428/286; 428/346; 428/354; 428/542.8; 74/551.9; 81/489; 16/DIG. 12; 273/75; 273/81 B; 273/81 R

[58] Field of Search ............ 428/156, 167, 172, 178, 428/174, 179, 76, 95, 96, 120, 141, 212, 224, 245, 284, 286, 343, 346, 354, 542.8; 273/75, 81 B, 81 R; 16/DIG. 12; 81/489; 74/543, 551.9

[56] References Cited

U.S. PATENT DOCUMENTS

| | | | |
|---|---|---|---|
| 3,684,348 | 8/1972 | Rowland | 350/103 |
| 3,689,346 | 9/1972 | Rowland | 350/103 |
| 4,576,850 | 3/1986 | Martens | 428/156 |
| 4,959,265 | 8/1990 | Wood | 428/343 |
| 5,055,340 | 10/1991 | Matsumura | 428/167 |

FOREIGN PATENT DOCUMENTS

| | | |
|---|---|---|
| 2807658A1 | 9/1979 | Fed. Rep. of Germany . |
| 3203023A1 | 8/1983 | Fed. Rep. of Germany . |
| 2125305 | 9/1972 | France . |
| 2669543 | 5/1992 | France . |
| 2057894 | 4/1981 | United Kingdom . |
| 2062479 | 5/1981 | United Kingdom . |
| WO85/04592 | 10/1985 | World Int. Prop. O. . |

Primary Examiner—Donald J. Loney
Attorney, Agent, or Firm—Gary L. Griswold; Walter N. Kirn; Robert H. Jordan

[57] ABSTRACT

A slip control sheeting comprising a backing having first and second major surfaces with an array of protrusions on the first major surface and at least one of (1) a layer of adhesive on the second major surface and (2) a reinforcing web at least partially embedded in the backing. The protrusions are pyramids with triangular bases having a height between about 3 and 21 mils and the array is defined in part by a pattern of three intersecting sets of parallel grooves formed in the first major surface, the grooves defining three major axes of the sheeting.

14 Claims, 4 Drawing Sheets

SLIP CONTROL SHEETING AND ARTICLES COVERED WITH SAME

FIELD OF THE INVENTION

The present invention relates to a slip control sheeting with a structured surface and articles, e.g., gymnastic apparatuses and tool and racquet handles, covered with such sheeting.

BACKGROUND

Gymnastic apparatuses such as pommel horses are typically covered with leather covers. Because such covers are usually somewhat slippery when new, they are typically conditioned by roughening with scouring pads, wire brushes, knives, etc. Scouring is typically done by hand with a circular motion resulting in a visible pattern of swirls on the surface. Conditioning in this fashion entails cutting and gouging the surface of the cover, tending to result in shortened life of the cover, making it necessary to have the apparatus recovered periodically.

Gymnasts frequently apply chalk to their hands when practicing and during performances. This chalk builds up on the cover of the apparatus, filling in the texture leaving a smooth, somewhat hard surface that must be brushed or sanded to remove the chalk. Because of the pattern of swirls and rough texture of a hand-conditioned cover, it is difficult to remove chalk as desired. In addition to chalk, such substances as KARO Brand Corn Syrup, pine tar, and spray adhesive are sometimes used by gymnasts to improve their grip to conventional covers.

In light of these conditions, conventional gymnastic apparatus covers, which cost several hundred dollars, may wear out after relatively short periods, presenting substantial costs to schools and other gymnasium operators. Also, surface conditioning practices and uneven wear may impart substantially non-uniform characteristics to a cover, presenting potentially unsafe conditions to a gymnast as seemingly similar portions of a cover may exhibit substantially different properties. In some cases, falls may lead to serious injuries such as broken bones and paralysis. The need for higher grip surfaces for gymnastics apparatuses has been known for a long time.

U.S. Pat. No. 3,585,101 (Stratton et al.) discloses a material comprising a film having a knurled pattern, e.g., a series of ridges, on one surface and an adhesive layer on the opposite surface. U.S. Pat. No. 4,488,918 (Jofs) discloses a plastic film having a non-slip surface comprising spaced random patterns of rigid peaks and ridges formed of a second thermoplastic layer coextruded with and bonded to the plastic film. European Patent Application No. 81830005.5, Publication No. 033,301 (Gibello) discloses handle coverings for tennis racquets and the like which comprise sleeves with relief patterns for a good grip. U.K. Patent No. 2,057,894 (Sasaki) discloses a tape for grips of game and sports appliances, e.g., racquets.

SUMMARY OF THE INVENTION

The present invention provides a novel and unobvious slip control sheeting having a structured surface as defined below and articles covered with such sheeting. The present invention also provides novel and unobvious gymnastic structures having such sheetings secured to the covers thereof.

In brief summary, the slip control sheeting of the invention comprises a backing having a first major surface and a second major surface. The first major surface bears an array of protrusions that are specially configured to provide desired slip control properties. Adapted to be secured to the surface of a gymnastic apparatus, e.g., pommel horse, the sheeting comprises at least one, and perhaps both, of (1) an adhesive layer on the second surface of the backing or (2) a fabric at least partially embedded in the backing.

The invention also provides articles such as gymnastic stations, athletic equipment, and tools to which slip control sheetings of the invention have been applied.

Among the many advantages that can be provided by this invention are that articles to which sheetings of the invention have been applied exhibit more uniform and more consistent slip control properties, thereby enhancing their safe use and convenient use. Also, articles such as gymnastic equipment covered with sheetings of the invention exhibit improved durability, retention of more uniform slip properties over entire service life time, and more consistent slip properties over the entire apparatus. Sheetings of the invention may be applied to new gymnastic equipment or may be applied to older equipment.

BRIEF DESCRIPTION OF DRAWING

The invention will be further explained with reference to the drawing, wherein:

FIGS. 1-3 are idealized and are not to scale. FIGS. 1-7 are all intended to be merely illustrative and non-limiting.

DETAILED DESCRIPTION OF ILLUSTRATIVE EMBODIMENTS

Figure 1:
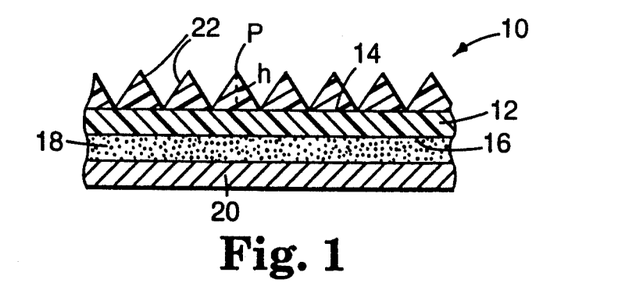
FIG. 1 is a cross-section of a portion of an illustrative slip control sheeting of the invention.

FIG. 1 illustrates an illustrative slip control sheeting of the invention 10 comprising backing 12 having first major surface 14 and second major face 16 and optional adhesive layer 18 on second major face 16. Adhesive layer 18 will typically be covered by optional release liner 20 during shipping and storage of sheeting 10. First major face 14 bears an array of triangular protrusions 22 thereon.

Protrusions 22 are typically triangular pyramids, i.e., three-sided pyramids, whose base is on first major surface of backing 12. Protrusions 22 may be discrete elements laminated to backing 12 or may be integral parts of backing 12, i.e., surface 14 may be structured in the form of protrusions 22.

The pyramids are typically between about 3 mils and about 21 mils (75 and 525 microns), preferably between about 5 mils and 9 mils (125 and 225 microns), and most preferably about 7 mils (175 microns), in height. As used herein and shown in FIG. 1, the height h of the pyramid refers to its dimension from its peak P to its base.

The three sides of the base of each pyramid are typically relatively equal in length. By relatively equal, it is meant that the length of the shortest side is equal to at least about 50 percent of the length of the longest side. In many instances, the base of each pyramid is an equilateral triangle. Each side is typically between about 5 and about 30 mils (125 and 750 microns), and preferably between about 10 and about 20 mils (250 and 500 microns), in length.

Figure 2:
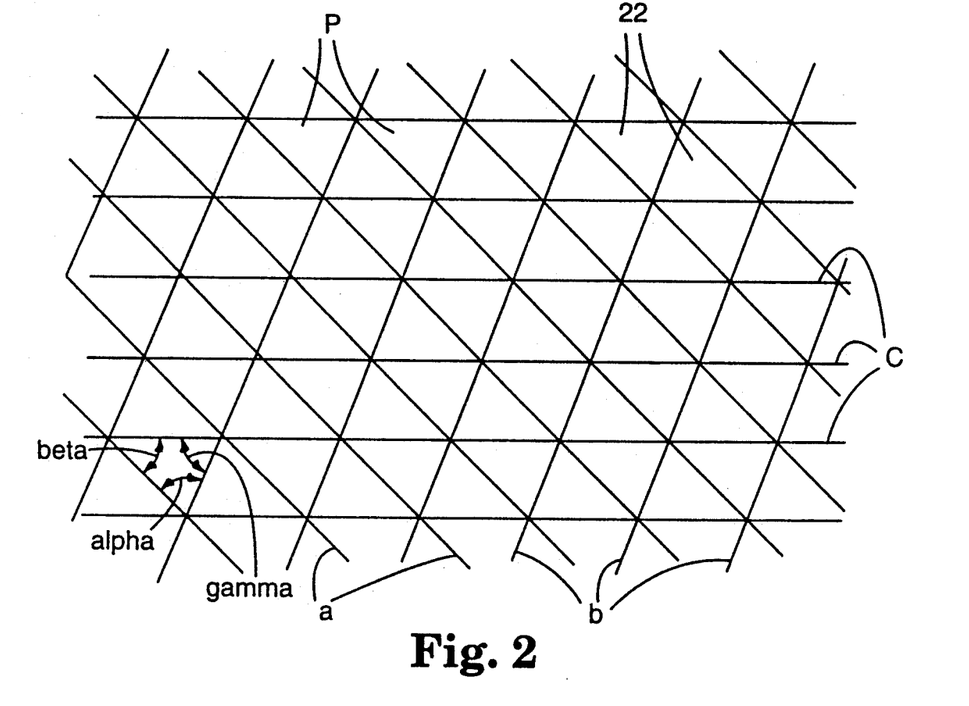
FIG. 2 is a plan view of a portion of the first major surface of an illustrative slip control sheeting of the invention.

As shown in FIG. 2, the bases of protrusions 22 are typically immediately adjacent one another. In the illustrative embodiment shown in FIG. 2, a pattern of three intersecting sets of parallel v-shaped grooves yields the structured surface. The apexes of each set of grooves are identified as a, b, and c. The base of each individual protrusion 22 is defined by one groove of each of the three sets. As mentioned above, the three sides of the base of each pyramid are typically relatively equal in length. This can be controlled by selection of the intersection angles between the three sets of grooves, i.e., angles alpha, beta, and gamma. Each side of the base of a protrusion and the peak of that protrusion defines a plane, referred to herein as a face of the protrusion. The three faces of each protrusion are typically preferably relatively equal in area.

The direction parallel to each set of grooves is referred to herein as a major axis of the sheeting. Thus, the sheeting has three major axes. We have found that the maximum grip or friction provided by sheeting of the invention is obtained in a direction perpendicular to one of the major axes of the sheeting.

Backing 12 typically comprises a film of at least one of the following: polyvinyl, polyurethane, polyester, e.g., polyethylene terephthalate, polyacrylic, polycarbonate, or polyolefin. Polyurethanes typically yield slip control sheetings which offer an optimum combination of high toughness and durability coupled with high softness and flexibility. Polyacrylics typically yield slip control sheetings that are relatively rigid.

Backing 12, excluding the height of the protrusions, is typically between about 2 mils and about 15 mils (50 and 375 microns) thick. In some instances, it will be sufficiently thick to embed a web, e.g., a sheet of fabric, therein. Such webs can impart increased tear resistance and tensile strength, enabling the slip control sheeting to be attached to a substrate via sewing more effectively. Also, in cases where such webs protrude from the back side of backing 12, they can provide an increased surface area, thereby improving the bond to an adhesive layer.

A sheeting of the invention may be formed by cutting a series of v-shaped grooves into a solid sheeting, molding a sheeting with the desired protrusions thereon, or molding pyramids then applying them to a desired backing sheet. Many of the techniques used for fabricating cube-corner retroreflective sheeting may be used to form slip control sheets of the invention, with the important advantage that the optical properties critical to retroreflective sheetings are not necessary for sheets of the invention. In fact, sheetings of the invention may be opaque if desired and may be made in a variety of colors as desired. U.S. Pat. No. 4,576,850 (Martens), which is incorporated in its entirety herein by reference, discloses a process for replicating microstructured surfaces that may be used in making sheetings of the invention. U.S. Pat. No. 3,689,346 (Rowland) also discloses a method comprising applying a hardenable molding material over a mold having a multiplicity of cube-corner formations therein.

In some instances, the pyramids may be made of a first, relatively hard and highly durable material, and backing 12 may be made of a relatively more flexible material. Such sheetings exhibit a combination of high durability and friction due to the hard pyramids (e.g., polycarbonate) coupled with a more conformable, flexible character (e.g., polyurethane) that results in a more cushioned impact during use.

Typically, a sheeting of the invention is sufficiently flexible to be wound about itself on a 1 inch diameter mandrel.

Referring again to FIG. 1, optional adhesive layer 20 typically comprises an adhesive selected to provide a strong bond to the substrate article to which the resultant sheeting is to be applied, e.g., heat-activated or pressure-sensitive adhesive. An illustrative example of a useful adhesive is Adhesive Transfer Tape 950 from Minnesota Mining and Manufacturing Company. Many suitable epoxy, urethane, and acrylic adhesives are commercially available.

Figure 3:
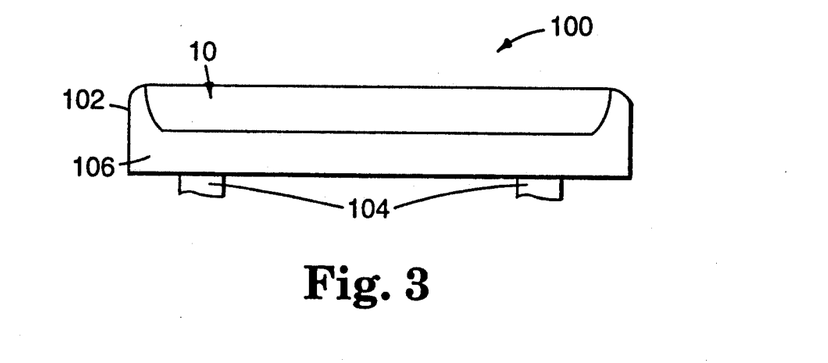
FIG. 3 is a plan view of a gymnastic station to which a sheeting of the invention has been applied.

Illustrative examples of gymnastic apparatuses or stations to which sheeting of the invention may be applied include vaulting horse, pommel horse, parallel bars, uneven bars, high bar, balance beam, vault spring board, and landing mats. FIG. 3 illustrates vaulting horse 100 with body 102 on legs 104. A slip control sheeting 10 has been applied to surface 106.

Desired flexibility, elasticity, and conformability of the sheeting is dependent in part upon the station to which it is to be applied. For instance, in the case of the balance beam, vaulting horse, pommel horse, vault spring board, and landing mats the sheeting should be somewhat elastic and conformable so as to give or compress under pressure of the gymnasts' hands and/or feet. During use the parallel bars, uneven bars, and high bar do not compress in this fashion but they typically flex. Accordingly, a sheeting of the invention for use thereon should be flexible.

Sheetings of the invention may be applied to the handles of such athletic equipment as softball bats, golf clubs, tennis, racquetball, squash, and badminton racquets. Sheetings of the invention may be applied to the handles of such tools as hammers, pliers, wire cutters, screw drivers, wrenches, etc.

Sheetings of the invention may be used with bars provided in rest rooms for handicapped persons or railings in stairwells as they are a convenient means for providing secure, effective slip control and readily cleaned or washed surfaces. They may also be applied to such articles as diving boards and the areas around swimming pools.

EXAMPLES

The invention will be further explained by the following illustrative examples which are intended to be nonlimiting.

Two resident male gymnastic athletes at the Olympic Training Center in Colorado Springs, Colo., regional finalists for the Senior National Team, were videotaped using a high speed video camera, NAC HSV-44, operating at 400 frames/second while performing two handspring full vaults each on two different vaulting horses. The vaulting horses were substantially identical except that Horse A was covered with a conventional plasticized polyvinyl chloride cover that was about 1 year old and Horse B was covered with a slip control sheeting comprising a 10 mil (250 micron) thick polyurethane backing with polyurethane protrusions thereon. The protrusions were three-sided pyramids about 7 mils (175 microns) in height formed from a master made by cutting v-shaped grooves, with angles alpha and beta equal to about 55° and angle gamma equal to about 70°. The grooves in set a were spaced about 14 mils (355 microns) apart, the grooves in set b were spaced about 16 mils (410 microns) apart, and those in set c were spaced about 6 mils (410 microns) apart.

Each gymnast wore a reflective target on the outside of his right hand near the proximal head of the fifth metacarpal. Digital analysis was performed using the Peak Performance Video and Analog Motion Measurement System from Peak Performance Technologies, Inc., Englewood, Colo., U.S.A. The video digitizing/playback system employed a Panasonic AG-7300 video cassette recorder, a Sony Trinitron monitor, and an IBM-compatible computer Coordinate data was smoothed using a low-pass, fourth order, zero lag Butterworth digital filter with a cutoff frequency of 5 Hertz. Smoothed coordinate data were used to calculate displacement and velocity parameters.

Table I contains the displacement results from Horse A. This information is shown graphically in FIG. 4. Table II contains the displacement results from Horse B. This information is shown graphically in FIG. 5.

Table III contains the resultant velocities for vaults 1 and 2 on Horse A. Table IV contains the resultant velocities for vaults 3 and 4 on Horse A. This information is shown graphically in FIG. 6.

Table V contains the resultant velocities for vaults 1 and 2 on Horse B. Table VI contains the resultant velocities for vaults 3 and 4 on Horse B. This information is shown graphically in FIG. 7.

TABLE I

Displacement Data: Horse A
Units: meters

| time (sec) | Vault #1 x displ. | Vault #1 y displ. | Vault #2 x displ. | Vault #2 y displ. | Vault #3 x displ. | Vault #3 y displ. | Vault #4 x displ. | Vault #4 y displ. |
|---|---|---|---|---|---|---|---|---|
| −0.1050 | −0.296 | 0.144 | −0.340 | 0.136 | −0.301 | 0.208 | −0.245 | 0.091 |
| −0.1025 | −0.285 | 0.139 | −0.330 | 0.133 | −0.293 | 0.204 | −0.235 | 0.087 |
| −0.1000 | −0.274 | 0.134 | −0.320 | 0.129 | −0.284 | 0.200 | −0.225 | 0.083 |
| −0.0975 | −0.263 | 0.129 | −0.310 | 0.126 | −0.276 | 0.196 | −0.215 | 0.080 |
| −0.0950 | −0.253 | 0.124 | −0.300 | 0.123 | −0.267 | 0.192 | −0.205 | 0.076 |
| −0.0925 | −0.242 | 0.119 | −0.290 | 0.119 | −0.258 | 0.187 | −0.195 | 0.072 |
| −0.0900 | −0.232 | 0.114 | −0.280 | 0.116 | −0.249 | 0.182 | −0.185 | 0.068 |
| −0.0875 | −0.222 | 0.109 | −0.270 | 0.112 | −0.240 | 0.178 | −0.176 | 0.065 |
| −0.0850 | −0.213 | 0.104 | −0.260 | 0.108 | −0.230 | 0.173 | −0.166 | 0.061 |
| −0.0825 | −0.204 | 0.099 | −0.250 | 0.104 | −0.221 | 0.168 | −0.156 | 0.057 |
| −0.0800 | −0.195 | 0.094 | −0.240 | 0.100 | −0.211 | 0.162 | −0.147 | 0.053 |
| −0.0775 | −0.186 | 0.089 | −0.230 | 0.096 | −0.202 | 0.157 | −0.138 | 0.049 |
| −0.0750 | −0.178 | 0.085 | −0.220 | 0.092 | −0.193 | 0.152 | −0.128 | 0.046 |
| −0.0725 | −0.170 | 0.080 | −0.210 | 0.087 | −0.183 | 0.146 | −0.120 | 0.042 |
| −0.0700 | −0.162 | 0.076 | −0.200 | 0.083 | −0.174 | 0.141 | −0.111 | 0.038 |
| −0.0675 | −0.155 | 0.072 | −0.190 | 0.078 | −0.165 | 0.135 | −0.102 | 0.035 |
| −0.0650 | −0.148 | 0.067 | −0.180 | 0.074 | −0.156 | 0.129 | −0.094 | 0.031 |
| −0.0625 | −0.141 | 0.063 | −0.170 | 0.069 | −0.147 | 0.123 | −0.086 | 0.028 |
| −0.0600 | −0.134 | 0.059 | −0.160 | 0.064 | −0.139 | 0.117 | −0.078 | 0.025 |
| −0.0575 | −0.128 | 0.055 | −0.160 | 0.060 | −0.130 | 0.111 | −0.071 | 0.022 |
| −0.0550 | −0.121 | 0.051 | −0.150 | 0.055 | −0.122 | 0.105 | −0.064 | 0.019 |
| −0.0525 | −0.115 | 0.047 | −0.140 | 0.050 | −0.114 | 0.099 | −0.058 | 0.017 |
| −0.0500 | −0.109 | 0.043 | −0.130 | 0.046 | −0.106 | 0.093 | −0.051 | 0.014 |
| −0.0475 | −0.103 | 0.040 | −0.130 | 0.042 | −0.099 | 0.087 | −0.045 | 0.012 |
| −0.0450 | −0.097 | 0.036 | −0.120 | 0.037 | −0.091 | 0.082 | −0.040 | 0.010 |
| −0.0425 | −0.091 | 0.033 | −0.110 | 0.033 | −0.084 | 0.076 | −0.035 | 0.009 |
| −0.0400 | −0.085 | 0.029 | −0.100 | 0.029 | −0.078 | 0.070 | −0.030 | 0.007 |
| −0.0375 | −0.079 | 0.026 | −0.100 | 0.026 | −0.071 | 0.064 | −0.025 | 0.006 |
| −0.0350 | −0.073 | 0.023 | −0.090 | 0.023 | −0.065 | 0.058 | −0.021 | 0.005 |
| −0.0325 | −0.067 | 0.020 | −0.080 | 0.020 | −0.058 | 0.053 | −0.018 | 0.004 |
| −0.0300 | −0.061 | 0.018 | −0.080 | 0.017 | −0.053 | 0.047 | −0.015 | 0.003 |
| −0.0275 | −0.055 | 0.015 | −0.070 | 0.014 | −0.047 | 0.042 | −0.012 | 0.003 |
| −0.0250 | −0.049 | 0.013 | −0.060 | 0.012 | −0.041 | 0.037 | −0.009 | 0.002 |
| −0.0225 | −0.044 | 0.011 | −0.060 | 0.010 | −0.036 | 0.032 | −0.007 | 0.002 |
| −0.0200 | −0.038 | 0.009 | −0.050 | 0.008 | −0.031 | 0.028 | −0.005 | 0.002 |
| −0.0175 | −0.033 | 0.008 | −0.040 | 0.007 | −0.027 | 0.023 | −0.004 | 0.001 |
| −0.0150 | −0.028 | 0.006 | −0.040 | 0.005 | −0.022 | 0.019 | −0.003 | 0.001 |
| −0.0125 | −0.023 | 0.005 | −0.030 | 0.004 | −0.018 | 0.015 | −0.002 | 0.001 |
| −0.0100 | −0.018 | 0.004 | −0.030 | 0.003 | −0.014 | 0.012 | −0.001 | 0.001 |
| −0.0075 | −0.013 | 0.003 | −0.020 | 0.002 | −0.010 | 0.008 | 0.000 | 0.001 |
| −0.0050 | −0.009 | 0.002 | −0.010 | 0.002 | −0.006 | 0.005 | 0.000 | 0.001 |
| −0.0025 | −0.004 | 0.001 | −0.010 | 0.001 | −0.003 | 0.002 | 0.000 | 0.000 |
| 0.0000 | 0.000 | 0.000 | 0.000 | 0.000 | 0.000 | 0.000 | 0.000 | 0.000 |
| 0.0025 | 0.004 | −0.001 | 0.010 | 0.000 | 0.004 | −0.003 | 0.000 | 0.000 |
| 0.0050 | 0.007 | −0.001 | 0.010 | −0.001 | 0.006 | −0.005 | 0.000 | 0.000 |
| 0.0075 | 0.011 | −0.002 | 0.020 | −0.002 | 0.009 | −0.007 | 0.000 | 0.000 |
| 0.0100 | 0.014 | −0.002 | 0.020 | −0.002 | 0.012 | −0.009 | −0.001 | 0.000 |
| 0.0125 | 0.017 | −0.003 | 0.030 | −0.003 | 0.015 | −0.011 | −0.001 | 0.000 |
| 0.0150 | 0.019 | −0.003 | 0.040 | −0.003 | 0.017 | −0.013 | −0.001 | 0.000 |
| 0.0175 | 0.022 | −0.004 | 0.040 | −0.004 | 0.019 | −0.015 | −0.002 | 0.000 |
| 0.0200 | 0.024 | −0.004 | 0.050 | −0.005 | 0.022 | −0.016 | −0.002 | 0.000 |

TABLE I-continued

Displacement Data: Horse A
Units: meters

| time (sec) | Vault #1 | | Vault #2 | | Vault #3 | | Vault #4 | |
|---|---|---|---|---|---|---|---|---|
| | x displ. | y displ. | x displ. | y displ. | x displ. | y displ. | x displ. | y displ. |
| 0.0225 | 0.026 | −0.004 | 0.060 | −0.005 | 0.024 | −0.018 | −0.003 | 0.000 |
| 0.0250 | 0.028 | −0.005 | 0.060 | −0.006 | 0.026 | −0.019 | −0.003 | 0.000 |
| 0.0275 | 0.029 | −0.005 | 0.070 | −0.007 | 0.028 | −0.021 | −0.003 | 0.000 |
| 0.0300 | 0.030 | −0.005 | 0.080 | −0.007 | 0.031 | −0.022 | −0.004 | 0.000 |
| 0.0325 | 0.031 | −0.006 | 0.080 | −0.008 | 0.033 | −0.023 | −0.004 | 0.000 |
| 0.0350 | 0.032 | −0.006 | 0.090 | −0.009 | 0.035 | −0.025 | −0.005 | 0.000 |
| 0.0375 | 0.033 | −0.006 | 0.090 | −0.010 | 0.036 | −0.026 | −0.005 | 0.001 |
| 0.0400 | 0.033 | −0.007 | 0.100 | −0.010 | 0.038 | −0.027 | −0.005 | 0.001 |
| 0.0425 | 0.034 | −0.007 | 0.100 | −0.011 | 0.040 | −0.028 | −0.006 | 0.001 |
| 0.0450 | 0.034 | −0.007 | 0.110 | −0.012 | 0.041 | −0.029 | −0.006 | 0.002 |
| 0.0475 | 0.034 | −0.007 | 0.110 | −0.013 | 0.043 | −0.029 | −0.006 | 0.002 |
| 0.0500 | 0.034 | −0.007 | 0.110 | −0.014 | 0.044 | −0.030 | −0.006 | 0.003 |
| 0.0525 | 0.034 | −0.007 | 0.120 | −0.015 | 0.045 | −0.031 | −0.006 | 0.003 |
| 0.0550 | 0.034 | −0.007 | 0.120 | −0.016 | 0.046 | −0.031 | −0.006 | 0.004 |
| 0.0575 | 0.034 | −0.008 | 0.120 | −0.017 | 0.047 | −0.032 | −0.006 | 0.005 |
| 0.0600 | 0.034 | −0.008 | 0.120 | −0.018 | 0.048 | −0.032 | −0.006 | 0.006 |
| 0.0625 | 0.034 | −0.008 | 0.120 | −0.019 | 0.048 | −0.032 | −0.006 | 0.007 |
| 0.0650 | 0.034 | −0.008 | 0.130 | −0.020 | 0.048 | −0.032 | −0.005 | 0.008 |
| 0.0675 | 0.033 | −0.008 | 0.130 | −0.022 | 0.049 | −0.032 | −0.005 | 0.010 |
| 0.0700 | 0.033 | −0.008 | 0.130 | −0.023 | 0.049 | −0.032 | −0.004 | 0.011 |
| 0.0725 | 0.033 | −0.008 | 0.120 | −0.025 | 0.049 | −0.032 | −0.004 | 0.013 |
| 0.0750 | 0.033 | −0.007 | 0.120 | −0.026 | 0.049 | −0.032 | −0.003 | 0.015 |
| 0.0775 | 0.033 | −0.007 | 0.120 | −0.028 | 0.049 | −0.031 | −0.002 | 0.016 |
| 0.0800 | 0.033 | −0.007 | 0.120 | −0.029 | 0.048 | −0.031 | −0.001 | 0.018 |
| 0.0825 | 0.033 | −0.007 | 0.120 | −0.031 | 0.048 | −0.030 | 0.000 | 0.021 |
| 0.0850 | 0.033 | −0.007 | 0.120 | −0.032 | 0.048 | −0.029 | 0.001 | 0.023 |
| 0.0875 | 0.033 | −0.006 | 0.110 | −0.034 | 0.048 | −0.028 | 0.002 | 0.026 |
| 0.0900 | 0.032 | −0.006 | 0.110 | −0.035 | 0.047 | −0.028 | 0.004 | 0.028 |
| 0.0925 | 0.032 | −0.006 | 0.110 | −0.036 | 0.047 | −0.027 | 0.005 | 0.031 |
| 0.0950 | 0.032 | −0.005 | 0.100 | −0.037 | 0.047 | −0.026 | 0.007 | 0.034 |
| 0.0975 | 0.032 | −0.005 | 0.100 | −0.038 | 0.046 | −0.024 | 0.008 | 0.036 |
| 0.1000 | 0.032 | −0.004 | 0.090 | −0.039 | 0.046 | −0.023 | 0.010 | 0.039 |
| 0.1025 | 0.032 | −0.004 | 0.090 | −0.039 | 0.046 | −0.022 | 0.012 | 0.042 |
| 0.1050 | 0.032 | −0.003 | 0.090 | −0.039 | 0.046 | −0.020 | | |
| 0.1075 | 0.032 | −0.002 | 0.080 | −0.039 | 0.045 | −0.018 | | |
| 0.1100 | 0.032 | −0.002 | 0.080 | −0.039 | 0.045 | −0.017 | | |
| 0.1125 | 0.031 | −0.001 | 0.070 | −0.039 | 0.045 | −0.015 | | |
| 0.1150 | 0.031 | 0.000 | 0.070 | −0.038 | 0.045 | −0.013 | | |
| 0.1175 | 0.031 | 0.001 | 0.060 | −0.037 | 0.045 | −0.011 | | |
| 0.1200 | 0.031 | 0.002 | 0.060 | −0.036 | 0.045 | −0.008 | | |
| 0.1225 | 0.031 | 0.003 | 0.050 | −0.034 | 0.045 | −0.006 | | |
| 0.1250 | 0.031 | 0.004 | 0.050 | −0.032 | 0.045 | −0.004 | | |
| 0.1275 | 0.032 | 0.005 | 0.040 | −0.030 | 0.045 | −0.001 | | |
| 0.1300 | 0.032 | 0.006 | 0.040 | −0.028 | 0.045 | 0.002 | | |
| 0.1325 | 0.032 | 0.008 | 0.030 | −0.026 | 0.045 | 0.005 | | |
| 0.1350 | 0.032 | 0.009 | 0.030 | −0.023 | 0.045 | 0.007 | | |
| 0.1375 | 0.032 | 0.010 | 0.020 | −0.020 | 0.046 | 0.010 | | |
| 0.1400 | 0.032 | 0.012 | 0.020 | −0.017 | 0.046 | 0.014 | | |
| 0.1425 | 0.033 | 0.013 | 0.020 | −0.014 | 0.046 | 0.017 | | |
| 0.1450 | 0.033 | 0.014 | 0.010 | −0.010 | 0.046 | 0.020 | | |
| 0.1475 | | | 0.010 | −0.007 | 0.046 | 0.024 | | |
| 0.1500 | | | 0.000 | −0.003 | 0.047 | 0.027 | | |
| 0.1525 | | | 0.000 | 0.000 | 0.047 | 0.031 | | |
| 0.1550 | | | −0.010 | 0.004 | 0.047 | 0.034 | | |
| 0.1575 | | | −0.010 | 0.008 | 0.047 | 0.038 | | |
| 0.1600 | | | | | 0.047 | 0.042 | | |
| 0.1625 | | | | | 0.047 | 0.045 | | |
| 0.1650 | | | | | 0.047 | 0.049 | | |
| 0.1675 | | | | | 0.047 | 0.053 | | |

TABLE II

Displacement Data: Horse B
Units: meters

| time (sec) | Vault #1 | | Vault #2 | | Vault #3 | | Vault #4 | |
|---|---|---|---|---|---|---|---|---|
| | x displ. | y displ. | x displ. | y displ. | x displ. | y displ. | x displ. | y displ. |
| −0.1050 | −0.162 | 0.107 | −0.171 | 0.120 | −0.103 | 0.076 | −0.138 | 0.089 |
| −0.1025 | −0.153 | 0.101 | −0.161 | 0.115 | −0.096 | 0.070 | −0.129 | 0.084 |
| −0.1000 | −0.143 | 0.096 | −0.151 | 0.110 | −0.089 | 0.065 | −0.121 | 0.079 |
| −0.0975 | −0.135 | 0.090 | −0.141 | 0.104 | −0.083 | 0.059 | −0.112 | 0.074 |
| −0.0950 | −0.126 | 0.084 | −0.131 | 0.099 | −0.076 | 0.054 | −0.104 | 0.069 |
| −0.0925 | −0.117 | 0.079 | −0.122 | 0.093 | −0.070 | 0.049 | −0.096 | 0.065 |
| −0.0900 | −0.109 | 0.073 | −0.112 | 0.088 | −0.064 | 0.044 | −0.088 | 0.060 |
| −0.0875 | −0.101 | 0.068 | −0.103 | 0.082 | −0.058 | 0.040 | −0.081 | 0.055 |
| −0.0850 | −0.093 | 0.062 | −0.094 | 0.077 | −0.053 | 0.035 | −0.073 | 0.050 |

TABLE II-continued

Displacement Data: Horse B
Units: meters

| time (sec) | Vault #1 | | Vault #2 | | Vault #3 | | Vault #4 | |
|---|---|---|---|---|---|---|---|---|
| | x displ. | y displ. | x displ. | y displ. | x displ. | y displ. | x displ. | y displ. |
| −0.0825 | −0.086 | 0.057 | −0.086 | 0.071 | −0.048 | 0.031 | −0.067 | 0.046 |
| −0.0800 | −0.078 | 0.052 | −0.078 | 0.066 | −0.043 | 0.028 | −0.060 | 0.042 |
| −0.0775 | −0.071 | 0.047 | −0.070 | 0.060 | −0.038 | 0.024 | −0.054 | 0.037 |
| −0.0750 | −0.065 | 0.042 | −0.062 | 0.055 | −0.034 | 0.021 | −0.048 | 0.033 |
| −0.0725 | −0.058 | 0.037 | −0.055 | 0.050 | −0.030 | 0.018 | −0.042 | 0.030 |
| −0.0700 | −0.052 | 0.033 | −0.049 | 0.045 | −0.026 | 0.015 | −0.037 | 0.026 |
| −0.0675 | −0.046 | 0.029 | −0.043 | 0.040 | −0.022 | 0.013 | −0.032 | 0.023 |
| −0.0650 | −0.041 | 0.025 | −0.037 | 0.035 | −0.019 | 0.011 | −0.028 | 0.020 |
| −0.0625 | −0.036 | 0.021 | −0.032 | 0.031 | −0.016 | 0.009 | −0.024 | 0.017 |
| −0.0600 | −0.031 | 0.018 | −0.027 | 0.027 | −0.014 | 0.007 | −0.020 | 0.014 |
| −0.0575 | −0.027 | 0.015 | −0.023 | 0.023 | −0.012 | 0.006 | −0.017 | 0.012 |
| −0.0550 | −0.023 | 0.012 | −0.019 | 0.019 | −0.010 | 0.005 | −0.014 | 0.010 |
| −0.0525 | −0.019 | 0.010 | −0.016 | 0.016 | −0.008 | 0.004 | −0.011 | 0.008 |
| −0.0500 | −0.016 | 0.008 | −0.013 | 0.013 | −0.006 | 0.003 | −0.009 | 0.007 |
| −0.0475 | −0.013 | 0.006 | −0.010 | 0.011 | −0.005 | 0.002 | −0.007 | 0.005 |
| −0.0450 | −0.010 | 0.005 | −0.008 | 0.009 | −0.004 | 0.002 | −0.005 | 0.004 |
| −0.0425 | −0.008 | 0.004 | −0.006 | 0.007 | −0.003 | 0.001 | −0.004 | 0.003 |
| −0.0400 | −0.006 | 0.003 | −0.005 | 0.005 | −0.002 | 0.001 | −0.003 | 0.002 |
| −0.0375 | −0.005 | 0.002 | −0.004 | 0.004 | −0.002 | 0.001 | −0.002 | 0.002 |
| −0.0350 | −0.003 | 0.001 | −0.003 | 0.003 | −0.001 | 0.000 | −0.001 | 0.001 |
| −0.0325 | −0.002 | 0.001 | −0.002 | 0.002 | −0.001 | 0.000 | 0.000 | 0.001 |
| −0.0300 | −0.001 | 0.000 | −0.001 | 0.001 | −0.001 | 0.000 | 0.000 | 0.000 |
| −0.0275 | −0.001 | 0.000 | −0.001 | 0.001 | 0.000 | 0.000 | 0.000 | 0.000 |
| −0.0250 | −0.001 | 0.000 | −0.001 | 0.000 | 0.000 | 0.000 | 0.000 | 0.000 |
| −0.0225 | 0.000 | 0.000 | 0.000 | 0.000 | 0.000 | 0.000 | 0.000 | 0.000 |
| −0.0200 | 0.000 | 0.000 | 0.000 | 0.000 | 0.000 | 0.000 | 0.000 | 0.000 |
| −0.0175 | 0.000 | 0.000 | −0.001 | 0.000 | 0.000 | 0.000 | 0.000 | 0.000 |
| −0.0150 | 0.000 | 0.000 | −0.001 | 0.000 | 0.000 | 0.000 | 0.000 | 0.000 |
| −0.0125 | −0.001 | 0.000 | −0.001 | 0.000 | 0.000 | 0.000 | 0.000 | 0.000 |
| −0.0100 | −0.001 | 0.000 | −0.001 | 0.000 | 0.000 | 0.000 | 0.000 | 0.000 |
| −0.0075 | −0.001 | 0.000 | −0.002 | 0.000 | −0.001 | 0.000 | 0.000 | 0.000 |
| −0.0050 | −0.001 | 0.000 | −0.002 | 0.000 | 0.001 | 0.000 | 0.000 | 0.000 |
| −0.0025 | −0.002 | 0.000 | −0.002 | 0.000 | 0.001 | 0.000 | 0.000 | 0.000 |
| 0.0000 | −0.002 | 0.000 | −0.003 | 0.000 | −0.001 | 0.000 | −0.001 | 0.000 |
| 0.0025 | −0.002 | 0.000 | −0.003 | 0.000 | −0.001 | 0.000 | −0.001 | 0.000 |
| 0.0050 | −0.003 | 0.000 | −0.004 | 0.000 | −0.002 | 0.000 | −0.001 | 0.000 |
| 0.0075 | −0.003 | 0.000 | −0.004 | 0.001 | −0.002 | 0.000 | −0.001 | 0.000 |
| 0.0100 | −0.004 | 0.000 | −0.004 | 0.001 | −0.002 | 0.000 | −0.001 | 0.000 |
| 0.0125 | −0.004 | 0.000 | −0.005 | 0.001 | −0.002 | 0.000 | −0.001 | 0.000 |
| 0.0150 | −0.004 | 0.000 | −0.005 | 0.001 | −0.003 | 0.000 | −0.001 | 0.000 |
| 0.0175 | −0.005 | 0.000 | −0.005 | 0.002 | −0.003 | 0.000 | −0.001 | 0.001 |
| 0.0200 | −0.005 | 0.000 | −0.006 | 0.002 | −0.003 | 0.000 | −0.002 | 0.001 |
| 0.0225 | −0.005 | 0.000 | −0.006 | 0.002 | −0.003 | 0.000 | −0.002 | 0.001 |
| 0.0250 | −0.006 | 0.000 | −0.006 | 0.003 | −0.004 | 0.000 | −0.002 | 0.001 |
| 0.0275 | −0.006 | 0.000 | −0.006 | 0.003 | −0.004 | 0.000 | −0.002 | 0.001 |
| 0.0300 | −0.006 | 0.000 | −0.006 | 0.003 | −0.004 | 0.001 | −0.002 | 0.001 |
| 0.0325 | −0.006 | 0.001 | −0.006 | 0.004 | −0.004 | 0.001 | −0.002 | 0.001 |
| 0.0350 | −0.007 | 0.001 | −0.006 | 0.004 | −0.004 | 0.001 | −0.002 | 0.001 |
| 0.0375 | −0.007 | 0.001 | −0.006 | 0.005 | −0.004 | 0.001 | −0.002 | 0.001 |
| 0.0400 | −0.007 | 0.001 | −0.006 | 0.005 | −0.004 | 0.002 | −0.002 | 0.002 |
| 0.0425 | −0.007 | 0.001 | −0.006 | 0.006 | −0.004 | 0.002 | −0.002 | 0.002 |
| 0.0450 | −0.007 | 0.002 | −0.006 | 0.006 | −0.004 | 0.003 | −0.002 | 0.002 |
| 0.0475 | −0.008 | 0.002 | −0.006 | 0.007 | −0.004 | 0.003 | −0.003 | 0.002 |
| 0.0500 | −0.008 | 0.002 | −0.006 | 0.008 | −0.004 | 0.004 | −0.003 | 0.002 |
| 0.0525 | −0.008 | 0.003 | −0.006 | 0.009 | −0.004 | 0.004 | −0.003 | 0.002 |
| 0.0550 | −0.008 | 0.003 | −0.006 | 0.009 | −0.004 | 0.005 | −0.003 | 0.003 |
| 0.0575 | −0.008 | 0.003 | −0.005 | 0.011 | −0.004 | 0.006 | −0.003 | 0.003 |
| 0.0600 | −0.008 | 0.004 | −0.005 | 0.012 | −0.004 | 0.007 | −0.003 | 0.003 |
| 0.0625 | −0.008 | 0.004 | −0.005 | 0.013 | −0.004 | 0.008 | −0.003 | 0.003 |
| 0.0650 | −0.008 | 0.005 | −0.004 | 0.014 | −0.003 | 0.009 | −0.003 | 0.003 |
| 0.0675 | −0.008 | 0.005 | −0.004 | 0.016 | −0.003 | 0.011 | −0.003 | 0.003 |
| 0.0700 | −0.008 | 0.006 | −0.003 | 0.017 | −0.002 | 0.012 | −0.002 | 0.004 |
| 0.0725 | −0.008 | 0.006 | −0.003 | 0.019 | −0.002 | 0.014 | −0.002 | 0.004 |
| 0.0750 | −0.008 | 0.007 | −0.002 | 0.021 | −0.001 | 0.016 | −0.002 | 0.005 |
| 0.0775 | −0.008 | 0.008 | −0.002 | 0.024 | −0.001 | 0.018 | −0.002 | 0.005 |
| 0.0800 | −0.008 | 0.009 | −0.001 | 0.026 | 0.000 | 0.020 | −0.001 | 0.006 |
| 0.0825 | −0.008 | 0.010 | −0.001 | 0.028 | 0.001 | 0.023 | −0.001 | 0.007 |
| 0.0850 | −0.008 | 0.011 | 0.000 | 0.031 | 0.001 | 0.025 | −0.001 | 0.007 |
| 0.0875 | −0.007 | 0.012 | 0.000 | 0.034 | 0.002 | 0.028 | 0.000 | 0.009 |
| 0.0900 | −0.007 | 0.014 | 0.001 | 0.037 | 0.003 | 0.031 | 0.000 | 0.010 |
| 0.0925 | −0.007 | 0.015 | 0.001 | 0.040 | 0.004 | 0.034 | 0.001 | 0.011 |
| 0.0950 | −0.006 | 0.017 | 0.002 | 0.043 | 0.005 | 0.037 | 0.002 | 0.013 |
| 0.0975 | −0.006 | 0.019 | 0.002 | 0.046 | 0.006 | 0.040 | 0.002 | 0.015 |
| 0.1000 | −0.005 | 0.021 | 0.003 | 0.050 | 0.007 | 0.044 | 0.003 | 0.016 |
| 0.1025 | −0.005 | 0.023 | 0.004 | 0.053 | 0.008 | 0.047 | 0.004 | 0.019 |
| 0.1050 | −0.004 | 0.026 | 0.004 | 0.057 | −0.001 | 0.016 | 0.005 | 0.021 |
| 0.1075 | −0.004 | 0.028 | 0.005 | 0.060 | −0.001 | 0.018 | 0.006 | 0.024 |

TABLE II-continued

Displacement Data: Horse B
Units: meters

| time (sec) | Vault #1 x displ. | Vault #1 y displ. | Vault #2 x displ. | Vault #2 y displ. | Vault #3 x displ. | Vault #3 y displ. | Vault #4 x displ. | Vault #4 y displ. |
|---|---|---|---|---|---|---|---|---|
| 0.1100 | −0.003 | 0.031 | | | 0.000 | 0.020 | 0.007 | 0.027 |
| 0.1125 | −0.002 | 0.033 | | | 0.001 | 0.023 | 0.009 | 0.030 |
| 0.1150 | −0.002 | 0.036 | | | 0.001 | 0.025 | 0.010 | 0.033 |
| 0.1175 | −0.001 | 0.039 | | | 0.002 | 0.028 | 0.012 | 0.037 |
| 0.1200 | −0.001 | 0.042 | | | 0.003 | 0.031 | 0.013 | 0.040 |
| 0.1225 | −0.003 | 0.031 | | | 0.004 | 0.034 | 0.015 | 0.044 |
| 0.1250 | −0.002 | 0.033 | | | 0.005 | 0.037 | 0.016 | 0.048 |
| 0.1275 | −0.002 | 0.036 | | | 0.006 | 0.040 | 0.018 | 0.053 |
| 0.1300 | −0.001 | 0.039 | | | 0.007 | 0.044 | 0.019 | 0.057 |
| 0.1325 | −0.001 | 0.042 | | | 0.008 | 0.047 | 0.002 | 0.015 |
| 0.1350 | | | | | | | 0.003 | 0.016 |
| 0.1375 | | | | | | | 0.004 | 0.019 |
| 0.1400 | | | | | | | 0.005 | 0.021 |
| 0.1425 | | | | | | | 0.006 | 0.024 |
| 0.1450 | | | | | | | 0.007 | 0.027 |
| 0.1475 | | | | | | | 0.009 | 0.030 |
| 0.1500 | | | | | | | 0.010 | 0.033 |
| 0.1525 | | | | | | | 0.012 | 0.037 |
| 0.1550 | | | | | | | 0.013 | 0.040 |
| 0.1575 | | | | | | | 0.015 | 0.044 |
| 0.1600 | | | | | | | 0.016 | 0.048 |
| 0.1625 | | | | | | | 0.018 | 0.053 |
| 0.1650 | | | | | | | 0.019 | 0.057 |

TABLE III

Velocity Data: Horse A
Units: meters/sec.

| time | Vault #1 x comp. | Vault #1 y comp. | Vault #1 result | Vault #2 x comp. | Vault #2 y comp. | Vault #2 result |
|---|---|---|---|---|---|---|
| −0.1050 | 4.47 | −2.06 | 4.92 | 4.04 | −1.30 | 4.24 |
| −0.1025 | 4.42 | −2.05 | 4.88 | 4.03 | −1.31 | 4.24 |
| −0.1000 | 4.36 | −2.05 | 4.82 | 4.03 | −1.32 | 4.24 |
| −0.0975 | 4.29 | −2.04 | 4.75 | 4.02 | −1.35 | 4.24 |
| −0.0950 | 4.20 | −2.02 | 4.67 | 4.01 | −1.37 | 4.24 |
| −0.0925 | 4.11 | −2.01 | 4.57 | 3.99 | −1.41 | 4.23 |
| −0.0900 | 4.00 | −1.99 | 4.47 | 3.96 | −1.45 | 4.22 |
| −0.0875 | 3.89 | −1.97 | 4.36 | 3.94 | −1.49 | 4.21 |
| −0.0850 | 3.76 | −1.94 | 4.24 | 3.90 | −1.54 | 4.20 |
| −0.0825 | 3.64 | −1.92 | 4.11 | 3.87 | −1.59 | 4.18 |
| −0.0800 | 3.51 | −1.89 | 3.99 | 3.83 | −1.64 | 4.16 |
| −0.0775 | 3.38 | −1.86 | 3.86 | 3.78 | −1.68 | 4.14 |
| −0.0750 | 3.25 | −1.83 | 3.73 | 3.73 | −1.73 | 4.11 |
| −0.0725 | 3.13 | −1.79 | 3.60 | 3.67 | −1.77 | 4.08 |
| −0.0700 | 3.00 | −1.76 | 3.48 | 3.61 | −1.81 | 4.04 |
| −0.0675 | 2.89 | −1.72 | 3.36 | 3.54 | −1.84 | 3.99 |
| −0.0650 | 2.78 | −1.68 | 3.25 | 3.48 | −1.86 | 3.94 |
| −0.0625 | 2.69 | −1.65 | 3.15 | 3.41 | −1.88 | 3.89 |
| −0.0600 | 2.61 | −1.62 | 3.07 | 3.33 | −1.88 | 3.83 |
| −0.0575 | 2.55 | −1.59 | 3.01 | 3.26 | −1.87 | 3.76 |
| −0.0550 | 2.51 | −1.56 | 2.96 | 3.19 | −1.85 | 3.69 |
| −0.0525 | 2.48 | −1.53 | 2.91 | 3.12 | −1.82 | 3.61 |
| −0.0500 | 2.46 | −1.49 | 2.88 | 3.05 | −1.77 | 3.53 |
| −0.0475 | 2.44 | −1.46 | 2.84 | 2.98 | −1.72 | 3.44 |
| −0.0450 | 2.43 | −1.41 | 2.81 | 2.92 | −1.65 | 3.35 |
| −0.0425 | 2.42 | −1.36 | 2.78 | 2.86 | −1.57 | 3.26 |
| −0.0400 | 2.41 | −1.31 | 2.74 | 2.80 | −1.47 | 3.17 |
| −0.0375 | 2.40 | −1.24 | 2.70 | 2.75 | −1.37 | 3.07 |
| −0.0350 | 2.38 | −1.17 | 2.66 | 2.70 | −1.27 | 2.98 |
| −0.0325 | 2.36 | −1.10 | 2.61 | 2.66 | −1.16 | 2.90 |
| −0.0300 | 2.34 | −1.02 | 2.55 | 2.62 | −1.05 | 2.82 |
| −0.0275 | 2.31 | −0.93 | 2.49 | 2.59 | −0.94 | 2.75 |
| −0.0250 | 2.27 | −0.85 | 2.42 | 2.56 | −0.84 | 2.69 |
| −0.0225 | 2.22 | −0.77 | 2.35 | 2.54 | −0.74 | 2.64 |
| −0.0200 | 2.17 | −0.69 | 2.28 | 2.52 | −0.65 | 2.60 |
| −0.0175 | 2.11 | −0.62 | 2.20 | 2.51 | −0.57 | 2.57 |
| −0.0150 | 2.05 | −0.55 | 2.12 | 2.50 | −0.50 | 2.55 |
| −0.0125 | 1.98 | −0.49 | 2.04 | 2.50 | −0.44 | 2.54 |
| −0.0100 | 1.91 | −0.44 | 1.96 | 2.51 | −0.39 | 2.54 |
| −0.0075 | 1.84 | −0.39 | 1.88 | 2.51 | −0.34 | 2.54 |
| −0.0050 | 1.76 | −0.35 | 1.80 | 2.52 | −0.31 | 2.54 |
| −0.0025 | 1.68 | −0.32 | 1.71 | 2.54 | −0.28 | 2.55 |
| 0.0000 | 1.60 | −0.28 | 1.62 | 2.55 | −0.26 | 2.57 |
| 0.0025 | 1.51 | −0.25 | 1.53 | 2.57 | −0.25 | 2.58 |
| 0.0050 | 1.41 | −0.23 | 1.43 | 2.58 | −0.24 | 2.59 |
| 0.0075 | 1.32 | −0.21 | 1.33 | 2.59 | −0.23 | 2.60 |
| 0.0100 | 1.22 | −0.19 | 1.23 | 2.60 | −0.23 | 2.61 |
| 0.0125 | 1.12 | −0.18 | 1.13 | 2.60 | −0.23 | 2.61 |
| 0.0150 | 1.02 | −0.17 | 1.03 | 2.59 | −0.24 | 2.60 |
| 0.0175 | 0.92 | −0.16 | 0.93 | 2.58 | −0.25 | 2.59 |
| 0.0200 | 0.82 | −0.16 | 0.84 | 2.55 | −0.25 | 2.56 |
| 0.0225 | 0.72 | −0.15 | 0.74 | 2.51 | −0.26 | 2.53 |
| 0.0250 | 0.63 | −0.15 | 0.65 | 2.47 | −0.27 | 2.48 |
| 0.0275 | 0.54 | −0.14 | 0.56 | 2.40 | −0.27 | 2.42 |
| 0.0300 | 0.45 | −0.13 | 0.47 | 2.33 | −0.28 | 2.35 |
| 0.0325 | 0.37 | −0.13 | 0.39 | 2.24 | −0.29 | 2.26 |
| 0.0350 | 0.30 | −0.12 | 0.32 | 2.14 | −0.29 | 2.16 |
| 0.0375 | 0.23 | −0.10 | 0.25 | 2.03 | −0.30 | 2.06 |
| 0.0400 | 0.17 | −0.09 | 0.19 | 1.91 | −0.31 | 1.93 |
| 0.0425 | 0.12 | −0.08 | 0.14 | 1.77 | −0.32 | 1.80 |
| 0.0450 | 0.07 | −0.07 | 0.10 | 1.62 | −0.34 | 1.66 |
| 0.0475 | 0.04 | −0.06 | 0.07 | 1.47 | −0.35 | 1.51 |
| 0.0500 | 0.00 | −0.05 | 0.05 | 1.30 | −0.37 | 1.35 |
| 0.0525 | −0.02 | −0.04 | 0.04 | 1.13 | −0.40 | 1.19 |
| 0.0550 | −0.04 | −0.03 | 0.05 | 0.95 | −0.42 | 1.04 |
| 0.0575 | −0.05 | −0.02 | 0.05 | 0.76 | −0.45 | 0.88 |
| 0.0600 | −0.06 | −0.02 | 0.06 | 0.58 | −0.48 | 0.75 |
| 0.0625 | −0.06 | −0.01 | 0.06 | 0.39 | −0.51 | 0.64 |
| 0.0650 | −0.06 | 0.00 | 0.06 | 0.20 | −0.54 | 0.57 |
| 0.0675 | −0.06 | 0.01 | 0.06 | 0.02 | −0.56 | 0.56 |
| 0.0700 | −0.05 | 0.02 | 0.05 | −0.15 | −0.59 | 0.61 |
| 0.0725 | −0.05 | 0.03 | 0.06 | −0.33 | −0.61 | 0.69 |
| 0.0750 | −0.05 | 0.04 | 0.06 | −0.49 | −0.62 | 0.79 |
| 0.0775 | −0.04 | 0.06 | 0.07 | −0.65 | −0.62 | 0.90 |
| 0.0800 | −0.04 | 0.08 | 0.09 | −0.80 | −0.62 | 1.01 |
| 0.0825 | −0.04 | 0.10 | 0.11 | −0.94 | −0.60 | 1.12 |
| 0.0850 | −0.04 | 0.12 | 0.13 | −1.07 | −0.58 | 1.21 |
| 0.0875 | −0.04 | 0.14 | 0.15 | −1.19 | −0.54 | 1.30 |
| 0.0900 | −0.05 | 0.16 | 0.16 | −1.29 | −0.50 | 1.38 |
| 0.0925 | −0.05 | 0.17 | 0.18 | −1.39 | −0.44 | 1.46 |
| 0.0950 | −0.05 | 0.19 | 0.20 | −1.47 | −0.37 | 1.52 |
| 0.0975 | −0.05 | 0.20 | 0.21 | −1.55 | −0.30 | 1.58 |
| 0.1000 | −0.05 | 0.22 | 0.23 | −1.61 | −0.22 | 1.63 |
| 0.1025 | −0.05 | 0.24 | 0.24 | −1.67 | −0.13 | 1.68 |
| 0.1050 | −0.04 | 0.25 | 0.26 | −1.72 | −0.04 | 1.72 |
| 0.1075 | −0.04 | 0.27 | 0.28 | −1.76 | 0.05 | 1.76 |
| 0.1100 | −0.03 | 0.29 | 0.30 | −1.79 | 0.15 | 1.80 |
| 0.1125 | −0.02 | 0.32 | 0.32 | −1.82 | 0.25 | 1.84 |

TABLE III-continued

Velocity Data: Horse A
Units: meters/sec.

| | Vault #1 | | | Vault #2 | | |
|---|---|---|---|---|---|---|
| time | x comp. | y comp. | result | x comp. | y comp. | result. |
| 0.1150 | −0.01 | 0.34 | 0.34 | −1.85 | 0.35 | 1.88 |
| 0.1175 | 0.00 | 0.36 | 0.36 | −1.87 | 0.46 | 1.93 |
| 0.1200 | 0.01 | 0.39 | 0.39 | −1.89 | 0.56 | 1.97 |
| 0.1225 | 0.02 | 0.41 | 0.42 | −1.91 | 0.66 | 2.02 |
| 0.1250 | 0.03 | 0.44 | 0.44 | −1.92 | 0.76 | 2.06 |
| 0.1275 | 0.05 | 0.46 | 0.47 | −1.93 | 0.86 | 2.11 |
| 0.1300 | 0.06 | 0.49 | 0.49 | −1.94 | 0.95 | 2.16 |
| 0.1325 | 0.07 | 0.51 | 0.52 | −1.94 | 1.04 | 2.2 |
| 0.1350 | 0.07 | 0.53 | 0.54 | −1.95 | 1.12 | 2.25 |
| 0.1375 | 0.08 | 0.55 | 0.55 | −1.96 | 1.19 | 2.29 |
| 0.1400 | 0.08 | 0.56 | 0.57 | −1.96 | 1.26 | 2.33 |
| 0.1425 | 0.08 | 0.57 | 0.58 | −1.97 | 1.32 | 2.37 |
| 0.1450 | 0.08 | 0.58 | 0.58 | −1.97 | 1.37 | 2.4 |
| 0.1475 | | | | −1.97 | 1.42 | 2.43 |
| 0.1500 | | | | −1.97 | 1.45 | 2.45 |
| 0.1525 | | | | −1.97 | 1.47 | 2.46 |
| 0.1550 | | | | −1.98 | 1.49 | 2.47 |
| 0.1575 | | | | −1.98 | 1.5 | 2.48 |

TABLE IV

Velocity Data: Horse A
Units: meters/sec.

| | Vault #3 | | | Vault #4 | | |
|---|---|---|---|---|---|---|
| time | x comp. | y comp. | result | x comp. | y comp. | result. |
| −0.1050 | 3.17 | −1.41 | 3.47 | 4.00 | −1.49 | 4.27 |
| −0.1025 | 3.25 | −1.48 | 3.57 | 4.00 | −1.50 | 4.27 |
| −0.1000 | 3.34 | −1.54 | 3.68 | 3.99 | −1.50 | 4.26 |
| −0.0975 | 3.42 | −1.61 | 3.78 | 3.98 | −1.50 | 4.25 |
| −0.0950 | 3.50 | −1.68 | 3.88 | 3.96 | −1.51 | 4.24 |
| −0.0925 | 3.57 | −1.75 | 3.98 | 3.94 | −1.51 | 4.22 |
| −0.0900 | 3.63 | −1.82 | 4.06 | 3.92 | −1.51 | 4.20 |
| −0.0875 | 3.68 | −1.88 | 4.13 | 3.89 | −1.52 | 4.17 |
| −0.0850 | 3.71 | −1.94 | 4.19 | 3.85 | −1.52 | 4.14 |
| −0.0825 | 3.74 | −2.00 | 4.24 | 3.80 | −1.52 | 4.09 |
| −0.0800 | 3.75 | −2.05 | 4.28 | 3.75 | −1.51 | 4.04 |
| −0.0775 | 3.76 | −2.10 | 4.30 | 3.69 | −1.50 | 3.98 |
| −0.0750 | 3.75 | −2.15 | 4.32 | 3.61 | −1.49 | 3.91 |
| −0.0725 | 3.73 | −2.19 | 4.33 | 3.53 | −1.46 | 3.83 |
| −0.0700 | 3.70 | −2.23 | 4.32 | 3.44 | −1.43 | 3.73 |
| −0.0675 | 3.66 | −2.27 | 4.30 | 3.34 | −1.40 | 3.62 |
| −0.0650 | 3.61 | −2.30 | 4.28 | 3.24 | −1.35 | 3.51 |
| −0.0625 | 3.55 | −2.33 | 4.24 | 3.12 | −1.29 | 3.38 |
| −0.0600 | 3.48 | −2.35 | 4.20 | 3.00 | −1.23 | 3.24 |
| −0.0575 | 3.41 | −2.37 | 4.15 | 2.87 | −1.15 | 3.09 |
| −0.0550 | 3.33 | −2.38 | 4.09 | 2.73 | −1.07 | 2.93 |
| −0.0525 | 3.24 | −2.39 | 4.03 | 2.59 | −0.99 | 2.77 |
| −0.0500 | 3.16 | −2.40 | 3.96 | 2.45 | −0.90 | 2.61 |
| −0.0475 | 3.07 | −2.40 | 3.89 | 2.30 | −0.80 | 2.44 |
| −0.0450 | 2.98 | −2.39 | 3.82 | 2.15 | −0.71 | 2.26 |
| −0.0425 | 2.88 | −2.38 | 3.74 | 1.99 | −0.62 | 2.09 |
| −0.0400 | 2.79 | −2.36 | 3.65 | 1.84 | −0.54 | 1.92 |
| −0.0375 | 2.69 | −2.33 | 3.56 | 1.68 | −0.46 | 1.74 |
| −0.0350 | 2.60 | −2.29 | 3.46 | 1.52 | −0.39 | 1.57 |
| −0.0325 | 2.50 | −2.25 | 3.36 | 1.37 | −0.32 | 1.40 |
| −0.0300 | 2.41 | −2.19 | 3.26 | 1.21 | −0.26 | 1.24 |
| −0.0275 | 2.31 | −2.13 | 3.14 | 1.06 | −0.21 | 1.08 |
| −0.0250 | 2.21 | −2.06 | 3.02 | 0.92 | −0.17 | 0.93 |
| −0.0225 | 2.12 | −1.98 | 2.90 | 0.78 | −0.14 | 0.79 |
| −0.0200 | 2.02 | −1.89 | 2.77 | 0.65 | −0.11 | 0.66 |
| −0.0175 | 1.93 | −1.80 | 2.64 | 0.53 | −0.09 | 0.54 |
| −0.0150 | 1.84 | −1.70 | 2.50 | 0.42 | −0.07 | 0.43 |
| −0.0125 | 1.75 | −1.59 | 2.37 | 0.33 | −0.06 | 0.33 |
| −0.0100 | 1.66 | −1.49 | 2.23 | 0.24 | −0.05 | 0.24 |
| −0.0075 | 1.58 | −1.39 | 2.10 | 0.16 | −0.04 | 0.17 |
| −0.0050 | 1.50 | −1.29 | 1.98 | 0.10 | −0.04 | 0.10 |
| −0.0025 | 1.42 | −1.20 | 1.86 | 0.04 | −0.04 | 0.06 |
| 0.0000 | 1.35 | −1.11 | 1.74 | 0.00 | −0.04 | 0.04 |
| 0.0025 | 1.28 | −1.03 | 1.64 | −0.05 | −0.03 | 0.06 |
| 0.0050 | 1.21 | −0.96 | 1.55 | −0.08 | −0.03 | 0.08 |
| 0.0075 | 1.16 | −0.89 | 1.46 | −0.10 | −0.03 | 0.11 |
| 0.0100 | 1.10 | −0.83 | 1.38 | −0.12 | −0.02 | 0.13 |
| 0.0125 | 1.06 | −0.78 | 1.32 | −0.14 | −0.02 | 0.14 |

TABLE IV-continued

Velocity Data: Horse A
Units: meters/sec.

| | Vault #3 | | | Vault #4 | | |
|---|---|---|---|---|---|---|
| time | x comp. | y comp. | result | x comp. | y comp. | result. |
| 0.0150 | 1.02 | −0.74 | 1.26 | −0.15 | −0.01 | 0.15 |
| 0.0175 | 0.98 | −0.70 | 1.20 | −0.16 | −0.01 | 0.16 |
| 0.0200 | 0.95 | −0.66 | 1.16 | −0.16 | 0.00 | 0.16 |
| 0.0225 | 0.92 | −0.63 | 1.12 | −0.17 | 0.01 | 0.17 |
| 0.0250 | 0.90 | −0.60 | 1.08 | −0.17 | 0.02 | 0.17 |
| 0.0275 | 0.88 | −0.57 | 1.05 | −0.17 | 0.03 | 0.17 |
| 0.0300 | 0.85 | −0.55 | 1.01 | −0.16 | 0.04 | 0.17 |
| 0.0325 | 0.83 | −0.52 | 0.98 | −0.16 | 0.06 | 0.17 |
| 0.0350 | 0.80 | −0.49 | 0.94 | −0.15 | 0.07 | 0.17 |
| 0.0375 | 0.76 | −0.47 | 0.89 | −0.14 | 0.09 | 0.17 |
| 0.0400 | 0.73 | −0.44 | 0.85 | −0.13 | 0.12 | 0.17 |
| 0.0425 | 0.69 | −0.41 | 0.80 | −0.11 | 0.14 | 0.18 |
| 0.0450 | 0.64 | −0.38 | 0.74 | −0.09 | 0.17 | 0.20 |
| 0.0475 | 0.59 | −0.34 | 0.68 | −0.06 | 0.21 | 0.22 |
| 0.0500 | 0.53 | −0.31 | 0.62 | −0.04 | 0.24 | 0.25 |
| 0.0525 | 0.47 | −0.27 | 0.55 | −0.01 | 0.28 | 0.28 |
| 0.0550 | 0.41 | −0.23 | 0.47 | 0.02 | 0.32 | 0.32 |
| 0.0575 | 0.35 | −0.19 | 0.40 | 0.05 | 0.37 | 0.37 |
| 0.0600 | 0.29 | −0.14 | 0.32 | 0.08 | 0.41 | 0.42 |
| 0.0625 | 0.22 | −0.10 | 0.25 | 0.12 | 0.46 | 0.48 |
| 0.0650 | 0.17 | −0.05 | 0.18 | 0.15 | 0.51 | 0.54 |
| 0.0675 | 0.11 | −0.01 | 0.11 | 0.19 | 0.57 | 0.60 |
| 0.0700 | 0.07 | 0.03 | 0.07 | 0.23 | 0.62 | 0.66 |
| 0.0725 | 0.02 | 0.08 | 0.08 | 0.27 | 0.68 | 0.73 |
| 0.0750 | −0.01 | 0.11 | 0.12 | 0.32 | 0.74 | 0.80 |
| 0.0775 | −0.04 | 0.15 | 0.16 | 0.36 | 0.80 | 0.87 |
| 0.0800 | −0.07 | 0.19 | 0.20 | 0.40 | 0.85 | 0.94 |
| 0.0825 | −0.09 | 0.22 | 0.24 | 0.44 | 0.91 | 1.01 |
| 0.0850 | −0.10 | 0.26 | 0.28 | 0.49 | 0.97 | 1.08 |
| 0.0875 | −0.11 | 0.29 | 0.32 | 0.53 | 1.02 | 1.15 |
| 0.0900 | −0.12 | 0.33 | 0.35 | 0.57 | 1.06 | 1.20 |
| 0.0925 | −0.13 | 0.37 | 0.39 | 0.60 | 1.10 | 1.26 |
| 0.0950 | −0.13 | 0.41 | 0.43 | 0.63 | 1.13 | 1.30 |
| 0.0975 | −0.12 | 0.46 | 0.47 | 0.66 | 1.16 | 1.33 |
| 0.1000 | −0.12 | 0.50 | 0.52 | 0.67 | 1.17 | 1.35 |
| 0.1025 | −0.11 | 0.55 | 0.56 | 0.68 | 1.18 | 1.36 |
| 0.1050 | −0.10 | 0.59 | 0.60 | | | |
| 0.1075 | −0.09 | 0.64 | 0.65 | | | |
| 0.1100 | −0.08 | 0.69 | 0.69 | | | |
| 0.1125 | −0.06 | 0.73 | 0.74 | | | |
| 0.1150 | −0.05 | 0.78 | 0.78 | | | |
| 0.1175 | −0.03 | 0.83 | 0.83 | | | |
| 0.1200 | −0.01 | 0.87 | 0.87 | | | |
| 0.1225 | 0.00 | 0.92 | 0.92 | | | |
| 0.1250 | 0.02 | 0.96 | 0.97 | | | |
| 0.1275 | 0.03 | 1.01 | 1.01 | | | |
| 0.1300 | 0.05 | 1.06 | 1.06 | | | |
| 0.1325 | 0.06 | 1.1 | 1.1 | | | |
| 0.1350 | 0.07 | 1.15 | 1.15 | | | |
| 0.1375 | 0.07 | 1.19 | 1.19 | | | |
| 0.1400 | 0.07 | 1.23 | 1.23 | | | |
| 0.1425 | 0.08 | 1.27 | 1.27 | | | |
| 0.1450 | 0.07 | 1.3 | 1.31 | | | |
| 0.1475 | 0.07 | 1.34 | 1.34 | | | |
| 0.1500 | 0.06 | 1.37 | 1.37 | | | |
| 0.1525 | 0.05 | 1.4 | 1.4 | | | |
| 0.1550 | 0.05 | 1.43 | 1.43 | | | |
| 0.1575 | 0.04 | 1.46 | 1.46 | | | |
| 0.1600 | 0.03 | 1.48 | 1.48 | | | |
| 0.1625 | 0.02 | 1.5 | 1.5 | | | |
| 0.1650 | 0.02 | 1.51 | 1.51 | | | |
| 0.1675 | 0.01 | 1.52 | 1.52 | | | |
| 0.1700 | 0.01 | 1.53 | 1.53 | | | |

TABLE V

Velocity Data: Horse B
Units: meters/sec.

| | Vault #1 | | | Vault #2 | | |
|---|---|---|---|---|---|---|
| time | x comp. | y comp. | result | x comp. | y comp. | result. |
| −0.0850 | 3.64 | −1.95 | 4.13 | 2.83 | −2.24 | 3.61 |
| −0.0825 | 3.55 | −1.96 | 4.06 | 2.76 | −2.20 | 3.53 |
| −0.0800 | 3.46 | −1.97 | 3.98 | 2.69 | −2.15 | 3.45 |

TABLE V-continued

Velocity Data: Horse B
Units: meters/sec.

| time | Vault #1 x comp. | Vault #1 y comp. | Vault #1 result | Vault #2 x comp. | Vault #2 y comp. | Vault #2 result |
|---|---|---|---|---|---|---|
| −0.0775 | 3.36 | −1.96 | 3.89 | 2.61 | −2.09 | 3.35 |
| −0.0750 | 3.26 | −1.95 | 3.80 | 2.53 | −2.03 | 3.24 |
| −0.0725 | 3.15 | −1.94 | 3.70 | 2.44 | −1.95 | 3.13 |
| −0.0700 | 3.04 | −1.91 | 3.59 | 2.35 | −1.87 | 3.00 |
| −0.0675 | 2.93 | −1.88 | 3.47 | 2.25 | −1.78 | 2.87 |
| −0.0650 | 2.80 | −1.83 | 3.35 | 2.15 | −1.68 | 2.73 |
| −0.0625 | 2.68 | −1.78 | 3.22 | 2.04 | −1.58 | 2.58 |
| −0.0600 | 2.55 | −1.71 | 3.07 | 1.93 | −1.47 | 2.43 |
| −0.0575 | 2.42 | −1.64 | 2.92 | 1.82 | −1.36 | 2.27 |
| −0.0550 | 2.28 | −1.56 | 2.77 | 1.70 | −1.24 | 2.10 |
| −0.0525 | 2.15 | −1.47 | 2.60 | 1.58 | −1.13 | 1.94 |
| −0.0500 | 2.00 | −1.37 | 2.43 | 1.45 | −1.01 | 1.77 |
| −0.0475 | 1.86 | −1.27 | 2.25 | 1.32 | −0.90 | 1.60 |
| −0.0450 | 1.71 | −1.17 | 2.07 | 1.20 | −0.80 | 1.44 |
| −0.0425 | 1.57 | −1.06 | 1.89 | 1.07 | −0.70 | 1.28 |
| −0.0400 | 1.42 | −0.96 | 1.71 | 0.95 | −0.61 | 1.13 |
| −0.0375 | 1.27 | −0.86 | 1.54 | 0.83 | −0.52 | 0.98 |
| −0.0350 | 1.13 | −0.77 | 1.36 | 0.73 | −0.44 | 0.85 |
| −0.0325 | 0.99 | −0.68 | 1.20 | 0.63 | −0.36 | 0.72 |
| −0.0300 | 0.85 | −0.59 | 1.04 | 0.54 | −0.29 | 0.62 |
| −0.0275 | 0.73 | −0.51 | 0.89 | 0.46 | −0.23 | 0.52 |
| −0.0250 | 0.61 | −0.43 | 0.75 | 0.39 | −0.18 | 0.43 |
| −0.0225 | 0.50 | −0.36 | 0.62 | 0.33 | −0.14 | 0.36 |
| −0.0200 | 0.41 | −0.30 | 0.50 | 0.27 | −0.10 | 0.29 |
| −0.0175 | 0.32 | −0.24 | 0.40 | 0.22 | −0.08 | 0.24 |
| −0.0150 | 0.24 | −0.19 | 0.31 | 0.18 | −0.05 | 0.19 |
| −0.0125 | 0.18 | −0.14 | 0.23 | 0.14 | −0.04 | 0.15 |
| −0.0100 | 0.12 | −0.11 | 0.17 | 0.11 | −0.02 | 0.11 |
| −0.0075 | 0.08 | −0.08 | 0.11 | 0.08 | −0.02 | 0.08 |
| −0.0050 | 0.04 | −0.05 | 0.07 | 0.05 | −0.01 | 0.05 |
| −0.0025 | 0.02 | −0.03 | 0.04 | 0.03 | −0.01 | 0.03 |
| 0.0000 | −0.01 | −0.02 | 0.02 | 0.01 | −0.01 | 0.01 |
| 0.0025 | −0.02 | −0.01 | 0.03 | −0.01 | −0.01 | 0.02 |
| 0.0050 | −0.04 | 0.00 | 0.04 | −0.03 | −0.01 | 0.03 |
| 0.0075 | −0.05 | 0.01 | 0.05 | −0.04 | −0.01 | 0.05 |
| 0.0100 | −0.05 | 0.01 | 0.06 | −0.06 | −0.02 | 0.06 |
| 0.0125 | −0.06 | 0.02 | 0.06 | −0.07 | −0.01 | 0.07 |
| 0.0150 | −0.06 | 0.02 | 0.06 | −0.08 | −0.01 | 0.08 |
| 0.0175 | −0.06 | 0.02 | 0.07 | −0.09 | −0.01 | 0.09 |
| 0.0200 | −0.06 | 0.02 | 0.07 | −0.10 | −0.01 | 0.10 |
| 0.0225 | −0.06 | 0.03 | 0.06 | −0.10 | 0.00 | 0.10 |
| 0.0275 | −0.05 | 0.03 | 0.06 | −0.10 | 0.00 | 0.10 |
| 0.0300 | −0.05 | 0.03 | 0.06 | −0.10 | 0.00 | 0.10 |
| 0.0325 | −0.05 | 0.03 | 0.05 | −0.10 | 0.01 | 0.10 |
| 0.0350 | −0.04 | 0.03 | 0.05 | −0.10 | 0.02 | 0.10 |
| 0.0375 | −0.04 | 0.03 | 0.05 | −0.09 | 0.02 | 0.10 |
| 0.0400 | −0.04 | 0.03 | 0.05 | −0.09 | 0.03 | 0.09 |
| 0.0425 | −0.04 | 0.04 | 0.05 | −0.08 | 0.04 | 0.09 |
| 0.0450 | −0.04 | 0.04 | 0.06 | −0.08 | 0.05 | 0.09 |
| 0.0475 | −0.04 | 0.04 | 0.06 | −0.07 | 0.06 | 0.09 |
| 0.0500 | −0.04 | 0.05 | 0.06 | −0.06 | 0.07 | 0.09 |
| 0.0525 | −0.04 | 0.05 | 0.07 | −0.05 | 0.08 | 0.10 |
| 0.0550 | −0.04 | 0.06 | 0.07 | −0.05 | 0.09 | 0.10 |
| 0.0575 | −0.04 | 0.06 | 0.07 | −0.04 | 0.11 | 0.12 |
| 0.0600 | −0.04 | 0.06 | 0.07 | −0.03 | 0.13 | 0.13 |
| 0.0625 | −0.04 | 0.06 | 0.07 | −0.03 | 0.14 | 0.15 |
| 0.0650 | −0.04 | 0.06 | 0.07 | −0.02 | 0.16 | 0.16 |
| 0.0675 | −0.03 | 0.06 | 0.07 | −0.01 | 0.19 | 0.19 |
| 0.0700 | −0.03 | 0.06 | 0.07 | 0.00 | 0.21 | 0.21 |
| 0.0725 | −0.03 | 0.06 | 0.06 | 0.01 | 0.25 | 0.25 |
| 0.0750 | −0.02 | 0.05 | 0.06 | 0.03 | 0.28 | 0.28 |
| 0.0775 | −0.01 | 0.05 | 0.05 | 0.05 | 0.32 | 0.32 |
| 0.0800 | 0.00 | 0.06 | 0.06 | 0.07 | 0.36 | 0.37 |
| 0.0825 | 0.01 | 0.06 | 0.06 | 0.09 | 0.41 | 0.42 |
| 0.0850 | 0.02 | 0.07 | 0.07 | 0.11 | 0.47 | 0.48 |
| 0.0875 | 0.03 | 0.90 | 0.09 | 0.13 | 0.52 | 0.54 |
| 0.0900 | 0.05 | 0.11 | 0.12 | 0.16 | 0.59 | 0.61 |
| 0.0925 | 0.06 | 0.13 | 0.15 | 0.18 | 0.65 | 0.68 |
| 0.0950 | 0.08 | 0.16 | 0.18 | 0.20 | 0.72 | 0.75 |
| 0.0975 | 0.10 | 0.20 | 0.22 | 0.23 | 0.79 | 0.83 |
| 0.1000 | 0.11 | 0.24 | 0.27 | 0.25 | 0.87 | 0.90 |
| 0.1025 | 0.13 | 0.29 | 0.32 | 0.28 | 0.94 | 0.98 |
| 0.1050 | 0.15 | 0.34 | 0.37 | 0.30 | 1.01 | 1.06 |
| 0.1075 | 0.18 | 0.40 | 0.44 | 0.33 | 1.08 | 1.13 |
| 0.1100 | 0.20 | 0.46 | 0.50 | 0.35 | 1.14 | 1.20 |
| 0.1125 | 0.23 | 0.53 | 0.57 | 0.37 | 1.20 | 1.26 |
| 0.1150 | 0.25 | 0.60 | 0.65 | 0.39 | 1.25 | 1.31 |
| 0.1175 | 0.29 | 0.67 | 0.73 | 0.41 | 1.29 | 1.35 |
| 0.1200 | 0.32 | 0.75 | 0.82 | 0.42 | 1.31 | 1.38 |
| 0.1225 | 0.35 | 0.84 | 0.91 | 0.43 | 1.33 | 1.40 |
| 0.1250 | 0.39 | 0.93 | 1.01 | 0.43 | 1.34 | 1.41 |
| 0.1275 | 0.43 | 1.02 | 1.10 | | | |
| 0.1300 | 0.46 | 1.11 | 1.20 | | | |
| 0.1325 | 0.50 | 1.20 | 1.30 | | | |
| 0.1350 | 0.53 | 1.29 | 1.40 | | | |
| 0.1375 | 0.56 | 1.38 | 1.49 | | | |
| 0.1400 | 0.59 | 1.46 | 1.58 | | | |
| 0.1425 | 0.61 | 1.54 | 1.65 | | | |
| 0.1450 | 0.62 | 1.60 | 1.72 | | | |
| 0.1475 | 0.63 | 1.65 | 1.77 | | | |
| 0.1500 | 0.64 | 1.68 | 1.80 | | | |
| 0.1525 | 0.65 | 1.70 | 1.82 | | | |

TABLE VI

Velocity Data: Horse B
Units: meters/sec.

| time | Vault #3 x comp. | Vault #3 y comp. | Vault #3 result | Vault #4 x comp. | Vault #4 y comp. | Vault #4 result |
|---|---|---|---|---|---|---|
| −0.0850 | 4.02 | −2.14 | 4.56 | 3.71 | −2.25 | 4.34 |
| −0.0825 | 4.00 | −2.15 | 4.54 | 3.66 | −2.26 | 4.30 |
| −0.0800 | 3.98 | −2.15 | 4.52 | 3.59 | −2.26 | 4.24 |
| −0.0775 | 3.93 | −2.16 | 4.49 | 3.52 | −2.26 | 4.18 |
| −0.0750 | 3.87 | −2.17 | 4.44 | 3.44 | −2.25 | 4.11 |
| −0.0725 | 3.80 | −2.18 | 4.38 | 3.36 | −2.24 | 4.04 |
| −0.0700 | 3.70 | −2.19 | 4.30 | 3.27 | −2.22 | 3.95 |
| −0.0675 | 3.60 | −2.19 | 4.21 | 3.18 | −2.19 | 3.86 |
| −0.0650 | 3.48 | −2.20 | 4.11 | 3.08 | −2.15 | 3.76 |
| −0.0625 | 3.35 | −2.19 | 4.00 | 2.97 | −2.11 | 3.64 |
| −0.0600 | 3.20 | −2.18 | 3.87 | 2.86 | −2.05 | 3.52 |
| −0.0575 | 3.04 | −2.16 | 3.73 | 2.75 | −1.98 | 3.39 |
| −0.0550 | 2.88 | −2.12 | 3.57 | 2.63 | −1.90 | 3.25 |
| −0.0525 | 2.71 | −2.07 | 3.41 | 2.51 | −1.81 | 3.09 |
| −0.0500 | 2.53 | −2.00 | 3.22 | 2.38 | −1.71 | 2.93 |
| −0.0475 | 2.34 | −1.92 | 3.03 | 2.25 | −1.60 | 2.76 |
| −0.0450 | 2.16 | −1.83 | 2.83 | 2.11 | −1.48 | 2.58 |
| −0.0425 | 1.97 | −1.72 | 2.62 | 1.97 | −1.35 | 2.39 |
| −0.0400 | 1.79 | −1.60 | 2.40 | 1.83 | −1.22 | 2.20 |
| −0.0375 | 1.61 | −1.47 | 2.18 | 1.68 | −1.10 | 2.01 |
| −0.0350 | 1.43 | −1.34 | 1.96 | 1.54 | −0.97 | 1.82 |
| −0.0325 | 1.26 | −1.20 | 1.74 | 1.39 | −0.85 | 1.63 |
| −0.0300 | 1.10 | −1.07 | 1.53 | 1.24 | −0.74 | 1.44 |
| −0.0275 | 0.95 | −0.94 | 1.33 | 1.10 | −0.63 | 1.27 |
| −0.0250 | 0.81 | −0.81 | 1.14 | 0.95 | −0.54 | 1.09 |
| −0.0225 | 0.68 | −0.68 | 0.96 | 0.82 | −0.45 | 0.93 |
| −0.0200 | 0.56 | −0.57 | 0.80 | 0.69 | −0.36 | 0.78 |
| −0.0175 | 0.45 | −0.47 | 0.65 | 0.57 | −0.29 | 0.64 |
| −0.0150 | 0.35 | −0.38 | 0.52 | 0.45 | −0.23 | 0.51 |
| −0.0125 | 0.27 | −0.30 | 0.40 | 0.35 | −0.17 | 0.39 |
| −0.0100 | 0.19 | −0.23 | 0.30 | 0.26 | −0.13 | 0.29 |
| −0.0075 | 0.13 | −0.17 | 0.21 | 0.19 | −0.09 | 0.21 |
| −0.0050 | 0.07 | −0.13 | 0.14 | 0.12 | −0.06 | 0.13 |
| −0.0025 | 0.02 | −0.09 | 0.09 | 0.06 | −0.04 | 0.07 |
| 0.0000 | −0.02 | −0.06 | 0.06 | 0.01 | −0.02 | 0.02 |
| 0.0025 | −0.05 | −0.03 | 0.06 | −0.03 | 0.00 | 0.03 |
| 0.0050 | −0.08 | −0.01 | 0.08 | −0.06 | 0.01 | 0.06 |
| 0.0075 | −0.10 | 0.01 | 0.10 | −0.09 | 0.01 | 0.09 |
| 0.0100 | −0.12 | 0.02 | 0.12 | −0.11 | 0.02 | 0.11 |
| 0.0125 | −0.14 | 0.03 | 0.14 | −0.12 | 0.02 | 0.12 |
| 0.0150 | −0.15 | 0.04 | 0.15 | −0.13 | 0.02 | 0.13 |
| 0.0175 | −0.16 | 0.05 | 0.16 | −0.14 | 0.01 | 0.14 |
| 0.0200 | −0.16 | 0.05 | 0.17 | −0.15 | 0.01 | 0.15 |
| 0.0225 | −0.16 | 0.06 | 0.17 | −0.15 | 0.01 | 0.15 |
| 0.0275 | −0.16 | 0.07 | 0.18 | −0.15 | 0.00 | 0.15 |
| 0.0300 | −0.16 | 0.07 | 0.17 | −0.15 | 0.00 | 0.15 |
| 0.0325 | −0.15 | 0.08 | 0.17 | −0.15 | 0.00 | 0.15 |
| 0.0350 | −0.14 | 0.09 | 0.16 | −0.14 | 0.00 | 0.15 |
| 0.0375 | −0.12 | 0.10 | 0.16 | −0.14 | 0.01 | 0.14 |
| 0.0400 | −0.11 | 0.11 | 0.16 | −0.14 | 0.01 | 0.14 |

TABLE VI-continued

Velocity Data: Horse B
Units: meters/sec.

| time | Vault #3 x comp. | Vault #3 y comp. | Vault #3 result | Vault #4 x comp. | Vault #4 y comp. | Vault #4 result |
|---|---|---|---|---|---|---|
| 0.0425 | −0.10 | 0.12 | 0.15 | −0.13 | 0.02 | 0.13 |
| 0.0450 | −0.09 | 0.13 | 0.15 | −0.12 | 0.03 | 0.13 |
| 0.0475 | −0.07 | 0.14 | 0.16 | −0.12 | 0.04 | 0.12 |
| 0.0500 | −0.06 | 0.15 | 0.16 | −0.11 | 0.05 | 0.12 |
| 0.0525 | −0.05 | 0.16 | 0.17 | −0.10 | 0.06 | 0.12 |
| 0.0550 | −0.03 | 0.17 | 0.18 | −0.09 | 0.07 | 0.12 |
| 0.0575 | −0.02 | 0.19 | 0.19 | −0.09 | 0.07 | 0.11 |
| 0.0600 | −0.01 | 0.20 | 0.20 | −0.08 | 0.08 | 0.12 |
| 0.0625 | 0.01 | 0.22 | 0.22 | −0.08 | 0.09 | 0.12 |
| 0.0650 | 0.03 | 0.24 | 0.24 | −0.07 | 0.10 | 0.12 |
| 0.0675 | 0.04 | 0.26 | 0.26 | −0.06 | 0.10 | 0.12 |
| 0.0700 | 0.06 | 0.28 | 0.29 | −0.06 | 0.11 | 0.12 |
| 0.0725 | 0.08 | 0.31 | 0.32 | −0.05 | 0.12 | 0.13 |
| 0.0750 | 0.10 | 0.35 | 0.36 | −0.05 | 0.13 | 0.14 |
| 0.0775 | 0.12 | 0.39 | 0.40 | −0.04 | 0.14 | 0.14 |
| 0.0800 | 0.13 | 0.43 | 0.45 | −0.04 | 0.15 | 0.16 |
| 0.0825 | 0.15 | 0.48 | 0.50 | −0.03 | 0.17 | 0.17 |
| 0.0850 | 0.16 | 0.53 | 0.55 | −0.02 | 0.18 | 0.18 |
| 0.0875 | 0.17 | 0.58 | 0.61 | −0.01 | 0.20 | 0.20 |
| 0.0900 | 0.18 | 0.64 | 0.67 | 0.00 | 0.22 | 0.22 |
| 0.0925 | 0.19 | 0.70 | 0.73 | 0.01 | 0.25 | 0.25 |
| 0.0950 | 0.19 | 0.77 | 0.79 | 0.02 | 0.28 | 0.28 |
| 0.0975 | 0.19 | 0.83 | 0.86 | 0.03 | 0.31 | 0.31 |
| 0.1000 | 0.20 | 0.90 | 0.92 | 0.05 | 0.35 | 0.35 |
| 0.1025 | 0.20 | 0.97 | 0.99 | 0.06 | 0.39 | 0.40 |
| 0.1050 | 0.20 | 1.03 | 1.05 | 0.07 | 0.44 | 0.45 |
| 0.1075 | 0.21 | 1.10 | 1.11 | 0.09 | 0.49 | 0.50 |
| 0.1100 | 0.21 | 1.15 | 1.17 | 0.11 | 0.55 | 0.56 |
| 0.1125 | 0.21 | 1.21 | 1.23 | 0.13 | 0.61 | 0.62 |
| 0.1150 | 0.22 | 1.26 | 1.28 | 0.14 | 0.67 | 0.69 |
| 0.1175 | 0.22 | 1.30 | 1.32 | 0.16 | 0.74 | 0.75 |
| 0.1200 | 0.23 | 1.34 | 1.36 | 0.18 | 0.80 | 0.82 |
| 0.1225 | 0.24 | 1.37 | 1.39 | 0.20 | 0.86 | 0.88 |
| 0.1250 | 0.24 | 1.39 | 1.41 | 0.21 | 0.91 | 0.94 |
| 0.1275 | 0.24 | 1.40 | 1.42 | 0.23 | 0.96 | 0.99 |
| 0.1300 | 0.24 | 1.41 | 1.43 | 0.24 | 1.01 | 1.03 |
| 0.1325 | | | | 0.24 | 1.04 | 1.07 |
| 0.1350 | | | | 0.25 | 1.07 | 1.10 |
| 0.1375 | | | | 0.25 | 1.09 | 1.12 |
| 0.1400 | | | | 0.25 | 1.11 | 1.13 |
| 0.1425 | | | | 0.25 | 1.11 | 1.14 |
| 0.1450 | | | | | | |
| 0.1475 | | | | | | |
| 0.1500 | | | | | | |
| 0.1525 | | | | | | |

Figure 4:
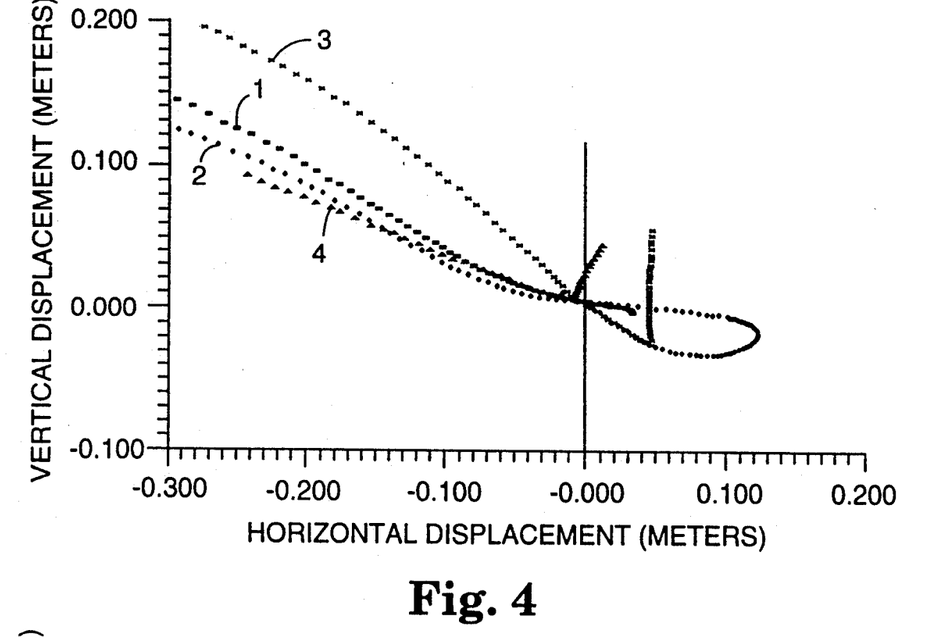
FIG. 4 is a graphical illustration of the paths of motion of the hands of illustrative gymnasts performing handspring full vaults using a horse with a conventional cover.
Figure 5:
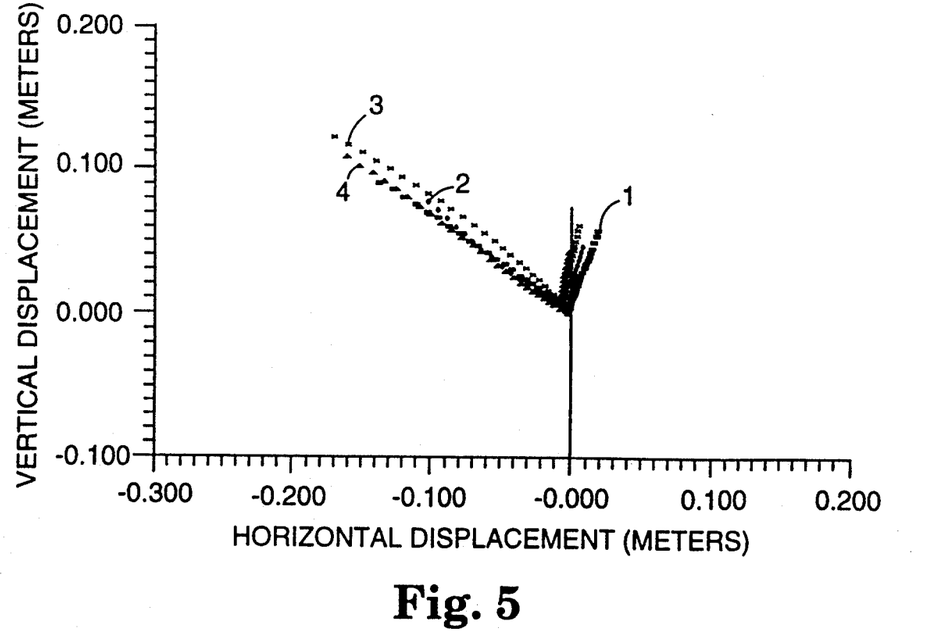
FIG. 5 is a graphical illustration of the paths of motion of the hands of illustrative gymnasts performing handspring full vaults using a horse covered with slip control sheeting of the invention.

FIG. 4 shows the path of the target over time for each of the vaults by both gymnasts on Horse A. FIG. 5 shows the path of the target over time for each vault by both gymnasts on Horse B. In FIGS. 4–7, curves 1 and 3 represent the vaults by the first gymnast and curves 2 and 4 represent the vaults by the second gymnast.

As shown by reference to FIG. 4, substantial slipping was encountered during each of the vaults performed on Horse A, i.e., with a conventional cover. In distinction, as is readily determined from FIG. 5, very little slipping was encountered during the vaults on Horse B. When using the slip control of the sheeting, the gymnasts were able to perform four, very uniform vaults.

Figure 6:
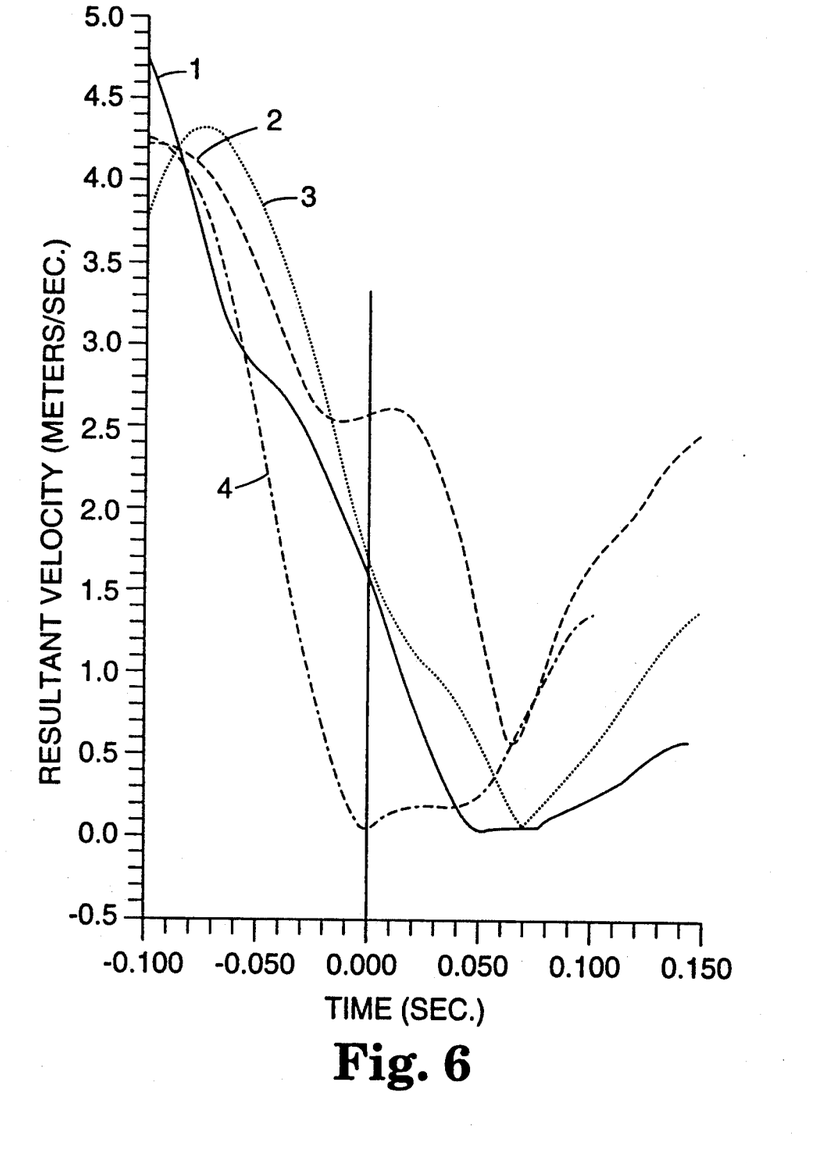
FIG. 6 is a graphical illustration of the resultant speed of the gymnasts in the vaults shown in FIG. 4.
Figure 7:
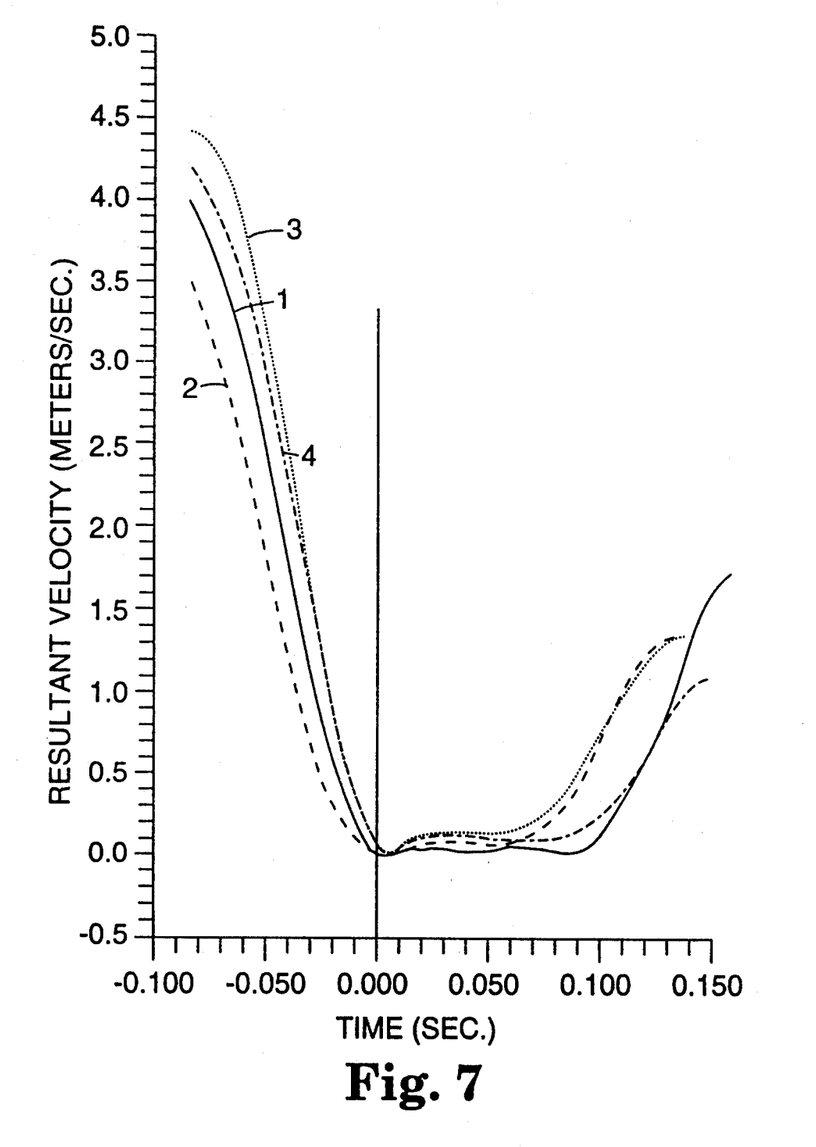
FIG. 7 is a graphical illustration of the resultant speed of the gymnasts in the vaults shown in FIG. 5.

FIG. 6 is a graphical illustration of the resultant velocities of the gymnasts in the vaults shown in FIG. 4 and FIG. 7 is a corresponding graphical illustration of the resultant velocities of the gymnasts in the vaults shown in FIG. 5. "Resultant velocity" is the magnitude of the vector sum of the vertical and horizontal velocities as calculated from the tables.

Various modifications and alterations of this invention will become apparent to those skilled in the art without departing from the scope and spirit of this invention.

We claim:

1. A slip control sheeting comprising a backing having a first and a second major surface and an array of protrusions on said first major surface of said backing, said protrusion being pyramids with triangular bases, the height of said protrusions being between about 3 mils and about 21 mils, said array being defined in part by a pattern of three intersecting sets of parallel grooves formed in said first major surface, which grooves define three major axes of said sheeting, said sheeting further comprising at least one of (1) a layer of adhesive on said second major surface and (2) a reinforcing web at least partially embedded in said backing.

2. The sheeting of claim 1 wherein said protrusions have a height of between about 5 and about 9 mils.

3. The sheeting of claim 1 wherein said protrusions have a height of about 7 mils.

4. The sheeting of claim 1 wherein the length of the sides of said bases is between about 5 and about 30 mils.

5. The sheeting of claim 1 wherein the length of the sides of said bases is between about 10 and about 20 mils.

6. The sheeting of claim 1 wherein said backing is between about 2 mils and about 15 mils thick.

7. The sheeting of claim 1 wherein said sheeting is sufficiently flexible to be wound about itself on a 1 inch diameter mandrel.

8. The sheeting of claim 1 wherein said backing comprises a film comprising a compound selected from the group consisting of polyvinyl, polyurethane, polyester, polyacrylic, polycarbonate, and polyolefin.

9. The sheeting of claim 1 wherein the bases of said protrusions are immediately adjacent one another.

10. The sheeting of claim 1 wherein said adhesive layer comprises one or more of the following: heat-activated adhesive, or pressure-sensitive adhesive.

11. A gymnastic apparatus having a sheeting of claim 1 on at least a portion of the surface thereof.

12. The gymnastic apparatus of claim 11 wherein said gymnastic apparatus is selected from the group consisting of: vaulting horse, pommel horse, parallel bars, uneven bars, high bar, balance beam, vault spring board, and landing mats.

13. A sheeting of claim 1 applied to the handle of a tool or racquet with said adhesive.

14. The sheeting of claim 8 wherein said backing comprises polyurethane.

* * * * *